United States Patent
Xu et al.

(10) Patent No.: US 12,063,625 B2
(45) Date of Patent: Aug. 13, 2024

(54) MULTI-HOP COMMUNICATIONS WITH USER EQUIPMENT (UE) COOPERATION

(71) Applicants: Hua Xu, Ottawa (CA); Jianglei Ma, Ottawa (CA)

(72) Inventors: Hua Xu, Ottawa (CA); Jianglei Ma, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 155 days.

(21) Appl. No.: 17/407,872

(22) Filed: Aug. 20, 2021

(65) Prior Publication Data

US 2022/0078755 A1    Mar. 10, 2022

Related U.S. Application Data

(60) Provisional application No. 63/074,651, filed on Sep. 4, 2020.

(51) Int. Cl.
*H04W 72/02* (2009.01)
*H04L 1/1812* (2023.01)
(Continued)

(52) U.S. Cl.
CPC .......... *H04W 72/02* (2013.01); *H04L 1/1819* (2013.01); *H04W 72/0446* (2013.01); *H04W 88/04* (2013.01)

(58) Field of Classification Search
CPC . H04W 72/02; H04W 72/0446; H04W 88/04; H04L 1/1819
See application file for complete search history.

(56) References Cited

U.S. PATENT DOCUMENTS

2008/0279145 A1    11/2008   Boariu et al.
2010/0214930 A1     8/2010   Hu et al.
(Continued)

FOREIGN PATENT DOCUMENTS

CN    101150515 A    3/2008
CN    101282156 A    10/2008
(Continued)

OTHER PUBLICATIONS

3GPP TR 22.866 V0.3.0, 3rd Generation Partnership Project; Technical Specification Group Services and System Aspects; enhanced Relays for Energy Efficiency and Extensive Coverage; Stage 1 (Release 17) May 2019, 34 pages.

*Primary Examiner* — Michael Thier
*Assistant Examiner* — Nevena Zecevic Sandhu

(57) ABSTRACT

Signaling for allocating communication resources is communicated in a wireless communication network. The signaling is for allocating the communication resources in a first time duration and a second time duration for relaying data, in respective hops of a multi-hop relay between first and second end nodes, by user equipment (UE) including one or more relay UEs at each hop for example. Such relaying of data in the respective hops involves relaying the data in a first hop of the multi-hop relay and in a second hop of the multi-hop relay between the first end node and the second end node. The communication resources in the first time duration are allocated for relaying the data in the first hop of the multi-hop relay and the communication resources in the second time duration are allocated for relaying the data in the second hop of the multi-hop relay.

20 Claims, 22 Drawing Sheets

(51) Int. Cl.
*H04W 72/0446* (2023.01)
*H04W 88/04* (2009.01)

(56) References Cited

U.S. PATENT DOCUMENTS

| | | | |
|---|---|---|---|
| 2010/0215009 A1 | 8/2010 | Yu et al. | |
| 2012/0113884 A1* | 5/2012 | Park | H04L 1/0009 370/312 |
| 2015/0029931 A1* | 1/2015 | Ryu | H04B 7/15528 370/315 |
| 2017/0331670 A1* | 11/2017 | Parkvall | H04W 52/028 |
| 2018/0152353 A1 | 5/2018 | Bergstrom et al. | |
| 2020/0092685 A1* | 3/2020 | Fehrenbach | H04W 84/047 |
| 2021/0144781 A1 | 5/2021 | Xu et al. | |
| 2021/0160956 A1* | 5/2021 | Wang | H04W 76/14 |
| 2023/0020567 A1* | 1/2023 | Huang | H04W 40/246 |
| 2023/0134982 A1* | 5/2023 | Liu | H04W 72/40 370/329 |
| 2023/0180098 A1* | 6/2023 | Harounabadi | H04W 40/24 370/315 |

FOREIGN PATENT DOCUMENTS

| | | |
|---|---|---|
| CN | 101296060 A | 10/2008 |
| CN | 101471756 A | 7/2009 |
| CN | 102014498 A | 4/2011 |
| JP | 2009130790 A | 6/2009 |
| WO | 2020164741 A1 | 8/2020 |

* cited by examiner

MULTI-HOP COMMUNICATIONS WITH USER EQUIPMENT (UE) COOPERATION

CROSS-REFERENCE TO RELATED APPLICATION

This application is related to and claims the benefit of U.S. Provisional Patent Application No. 63/074,651, filed on Sep. 4, 2020, the entire contents of which are incorporated herein by reference.

FIELD

This application relates generally to communications in a wireless communication network, and in particular to multi-hop communications that involve user equipment (UE) cooperation.

BACKGROUND

According to so-called "relay" techniques in Long Term Evolution (LTE) and New Radio (NR), UEs communicate directly with each other. A primary goal for relay techniques in LTE is for use in public safety applications, and new requirements are emerging in NR, for commercial applications and enhancements on public safety. Development of relay techniques can increase demand on performance of relay systems, in respect of such performance measures as system throughput, coverage, latency, and reliability. New applications and requirements for multi-hop relay in NR may be geared toward providing not only coverage extension but also system throughput enhancement, for video monitoring and feedback in police and firefighter applications for example.

UE cooperation (UC) involves cooperative procedures among UEs in a group of UEs, and may be achieved by a group of UEs helping each other with either or both of downlink and uplink communications to improve UE peak data rate and system throughput, especially at coverage area edges. One option for UC is to use UE relay, which involves a UE forwarding data for another UE. Cooperating UEs coordinate with each other, to assist a target UE to which data is targeted or destined, for example.

SUMMARY

Resource allocation for multi-hop UE relay communications presents a challenge at least in terms of increased latency as resources are allocated. According to embodiments disclosed herein, multi-hop performance may be improved by pre-configuring or pre-allocating communication resources for multiple hops of a multi-hop path or connection that involves multiple cooperating UEs between end nodes. Efficient resource allocation, for at least hops of a multi-hop path that involve UEs for example, may facilitate performance improvements such as lower latency and higher reliability of UC-based multi-hop communications.

One aspect of the present disclosure relates to a method that involves communicating, in a wireless communication network, signaling for allocating communication resources in a first time duration and a second time duration for relaying data, in respective hops of a multi-hop relay between first and second end nodes, by user equipment at each hop. Relaying data in respective hops of the multi-hop relay involves relaying the data in a first hop of the multi-hop relay, by one or more relay UEs at the first hop for example, and in a second hop of the multi-hop relay, by one or more relay UEs at the second hop for example, between the first end node and the second end node. The communication resources in the first time duration are allocated for relaying the data in the first hop of the multi-hop relay, by the one or more relay UEs at the first hop for example, and the communication resources in the second time duration are allocated for relaying the data in the second hop of the multi-hop relay, by the one or more relay UEs at the second hop for example.

An apparatus according to another aspect of the present disclosure includes a communication interface; a processor, coupled to the communication interface; and a non-transitory computer readable storage medium, coupled to the processor, storing programming for execution by the processor. Such a non-transitory computer readable storage medium need not necessarily be implemented in an apparatus, and could instead be implemented separately, in a computer program product for example.

The programming includes instructions to communicate, in a wireless communication network, signaling for allocating communication resources in a first time duration and a second time duration for relaying data, in respective hops of a multi-hop relay between first and second end nodes, by user equipment at each hop. Relaying data in respective hops of the multi-hop relay involves relaying the data in a first hop of the multi-hop relay, by one or more relay UEs at the first hop for example, and in a second hop of the multi-hop relay, by one or more relay UEs at the second hop for example, between the first end node and the second end node. The communication resources in the first time duration are allocated for relaying the data in the first hop of the multi-hop relay, by the one or more relay UEs at the first hop for example, and the communication resources in the second time duration are allocated for relaying the data in the second hop of the multi-hop relay, by the one or more relay UEs at the second hop for example.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

The present disclosure provides a general solution for multi-hop relay with UC, and includes embodiments that support network device-UE relay and UE-UE relay, potentially with bidirectional communication.

Aspects of UC-based multi-hop relay disclosed herein include the following:
  Resource allocation: To pre-configure communication resources in time and allocate resources to relaying data by UE relays in different hops to enable efficient multi-hop relay with lower latency and higher reliability—resource allocation according to some embodiments herein may enable the relay UE(s) at different hops to time-align their transmissions, including feedback if implemented, and may facilitate UE cooperation among the relay UE(s) at each hop;
  Different alternatives for signaling resource allocation for multi-hop relay with UC, including dynamic activation of data forwarding operation over multi-hop or indication of a start of data forwarding operation, according to a pre-configured end-to-end multi-hop transmission cycle for example;
  General procedures for communications involving multi-hop relay with UC;
  Hybrid automatic repeat request (HARQ) process: A multi-stage HARQ process and feedback for multi-hop relay with UC is disclosed.

These and other aspects of multi-hop communications with UE cooperation are discussed by way of example in further detail at least below.

Figure 1:
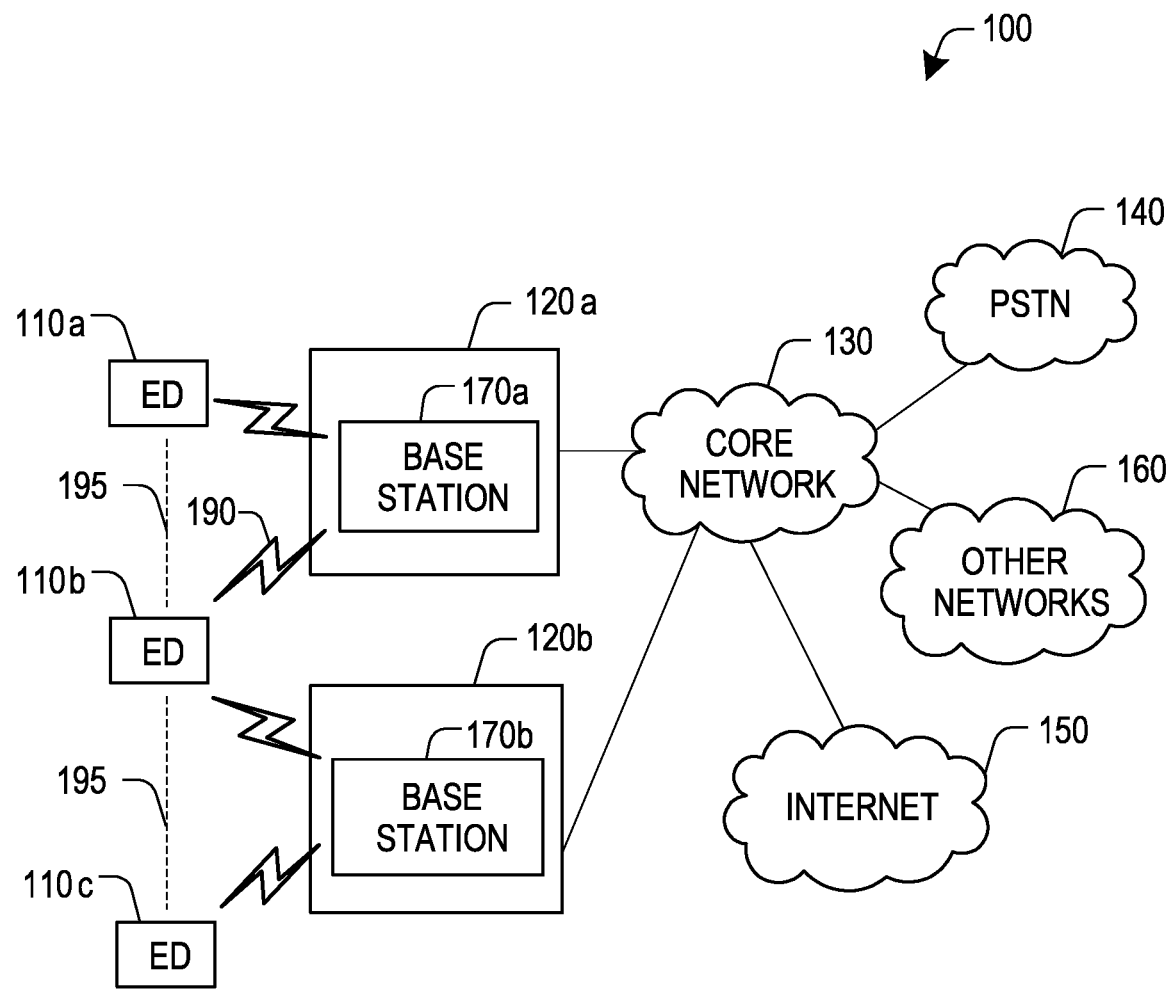
FIG. 1 illustrates an example communication system in which aspects of the present disclosure are implemented in some embodiments.

FIG. 1 illustrates an example communication system 100 in which aspects of the present disclosure are implemented in some embodiments. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a User Equipment/device (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, video monitoring camera or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a Base Transceiver Station (BTS), a Node-B (NodeB), an evolved NodeB (eNodeB), a Home eNodeB, a gNodeB or gNB (next generation NodeB, sometimes called a "gigabit" NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such nodes. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, μWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations using the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs may directly communicate with each other over sidelinks, for example, to enable UE cooperation in some embodiments.

Figure 2:
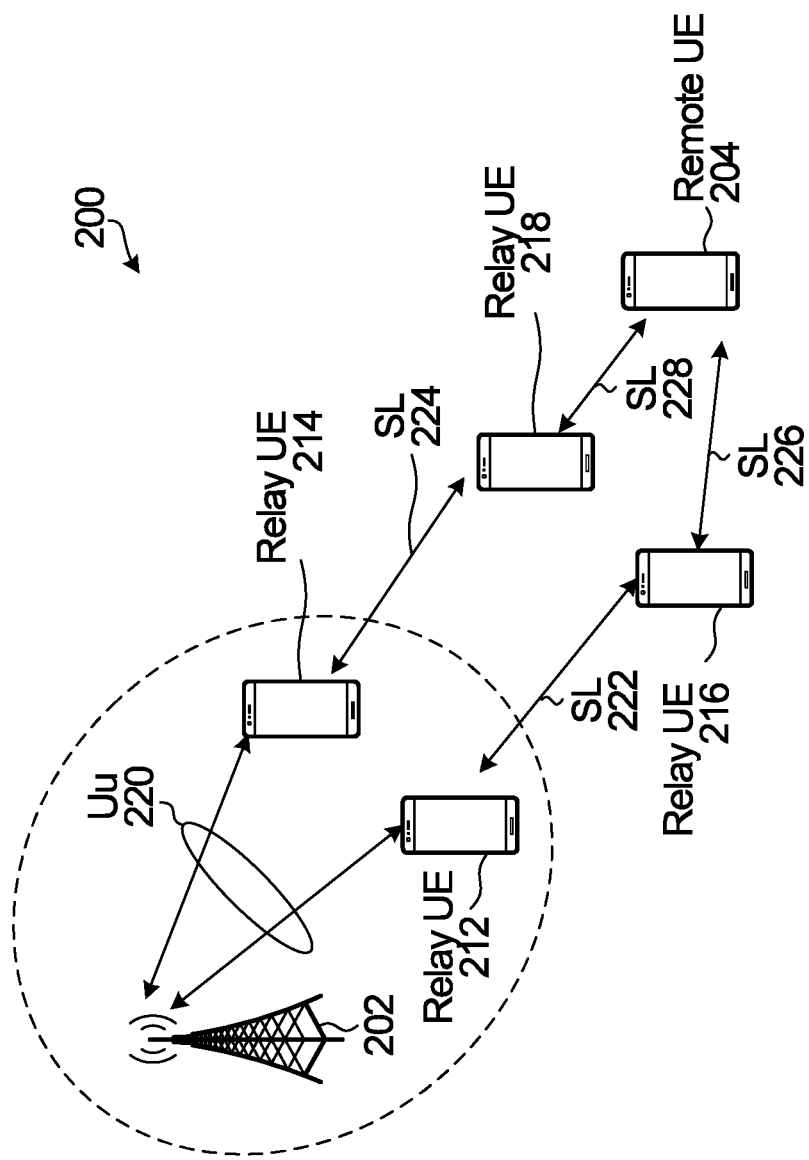
FIG. 2 is a block diagram of another example communication system illustrating UE cooperation and a multi-hop communication path.

FIG. 2 is a block diagram of the communication system, illustrating UE cooperation and a multi-hop communication path. The example system 200 includes network equipment 202, also referred to herein as a network device, and UEs 204, 212, 214, 216, 218. In a cellular network, a UE could connect to a network directly, through a direct communication link such as a so-called "Uu" link or another cellular link, over a Uu air interface for example. The UEs 212, 214 are "in-coverage" (within a geographical area of direct communication with the network device 202) as shown by the dashed line in FIG. 2, and communications between these UEs and the network device are through direct communication links shown by way of example as "Uu" links 220 in FIG. 2. Sidelink (SL) communications directly between the UEs 212, 216, directly between the UEs 214, 218, directly between the UEs 216, 204, and directly between the UEs 218, 204 are through respective sidelinks 222, 224, 226, 228. Examples of these components and implementation options for communications between these components are provided elsewhere herein. Network device 202 may be a base station 170a, 170b in FIG. 1 and the UEs may be EDs 110a-c in FIG. 1, for example.

UE cooperation may be used in the example in FIG. 2 to have the UEs 212, 214, or the UEs 216, 218, or all of these UEs, operate as relay UEs to assist the remote UE 204 with either or both of uplink and downlink communications with the network device 202. Although reference is made primarily to "relay UEs" herein, relay UEs may also or instead be referred to as cooperating UEs or cooperative UEs (CUEs), or otherwise, both herein and elsewhere.

Two multi-hop paths between the network device 202 and the remote UE 204 are shown in FIG. 2. One multi-hop path involves the relay UEs 212, 216, a Uu segment or link at 220, and sidelink segments or links at 222, 226. The other multi-hop path in this example involves the relay UEs 214, 218, a Uu segment or link at 220, and sidelink segments or links at 224, 228. In another possible embodiment, multiple UEs cooperate to relay data in each hop, such as at 212/214 and at 216/218, to provide a multi-hop path for which there are multiple link options for each hop. A "hop" is defined herein to refer to a relay topology comprising a relay UE or relay node between two other nodes. For example, a first hop refers to a topology for relaying data, by a first UE, from a source node to a second UE along a relay path, while a second hop refers to a topology to further relay the data along the relay path, by the second UE to a third UE, and so on and so forth. Therefore according to the above definition, a "multi-hop" relay path includes at least two consecutive relay nodes. Although "hop" is sometimes defined differently elsewhere to refer to the links between nodes, a conventional single relay topology includes two links between nodes (i.e., a first link between a first node and a second node, and a second link between the second node and a third node), and thus includes two hops according to the alternative definition. However, the conventional single relay topology, despite including two links, is not a "multi-hop" relay path according to the present disclosure.

For downlink transmission in the example 200, in an embodiment a gNB at 202 sends data to one or both of the in-coverage relay UEs 212, 214 on a Uu link 220, and each relay UE 212, 214 that receives the data from the gNB relays the data to the next relay UE 216, 218 over a respective sidelink 222, 224. Similarly, each relay UE 216, 218 that receives the data relays the data to the remote UE 204 over a respective sidelink 226, 228. In general, a multi-hop path according to the present disclosure includes at least one UE-UE segment, between two different "hops" as defined above, that involves direct communications between different UEs. In this downlink transmission example, there is a UE-UE segment between UEs of the hop at 212/214 and the hop at 216/218.

Regarding uplink transmission, in an embodiment the remote UE 204 transmits data to one or both of the nearby relay UEs 216, 218 over the sidelinks 226, 228, each of these relay UEs that receives the data from the remote UE 204 relays the data to its next relay UE 212, 214 over the sidelinks 222, 224, and each of the relay UEs 212, 214 that receives the data relays the data to the network device 202 over a Uu link 220. This uplink transmission example also involves a multi-hop path with a UE-UE segment between two hops.

FIG. 2 is a non-limiting and illustrative example. In other embodiments, UEs 216 and/or 218 could also be in coverage. More generally, any number of relay UEs could be in or out of coverage. The features disclosed herein may be implemented in conjunction with other communication systems having similar or different structures or topologies.

Figure 3:
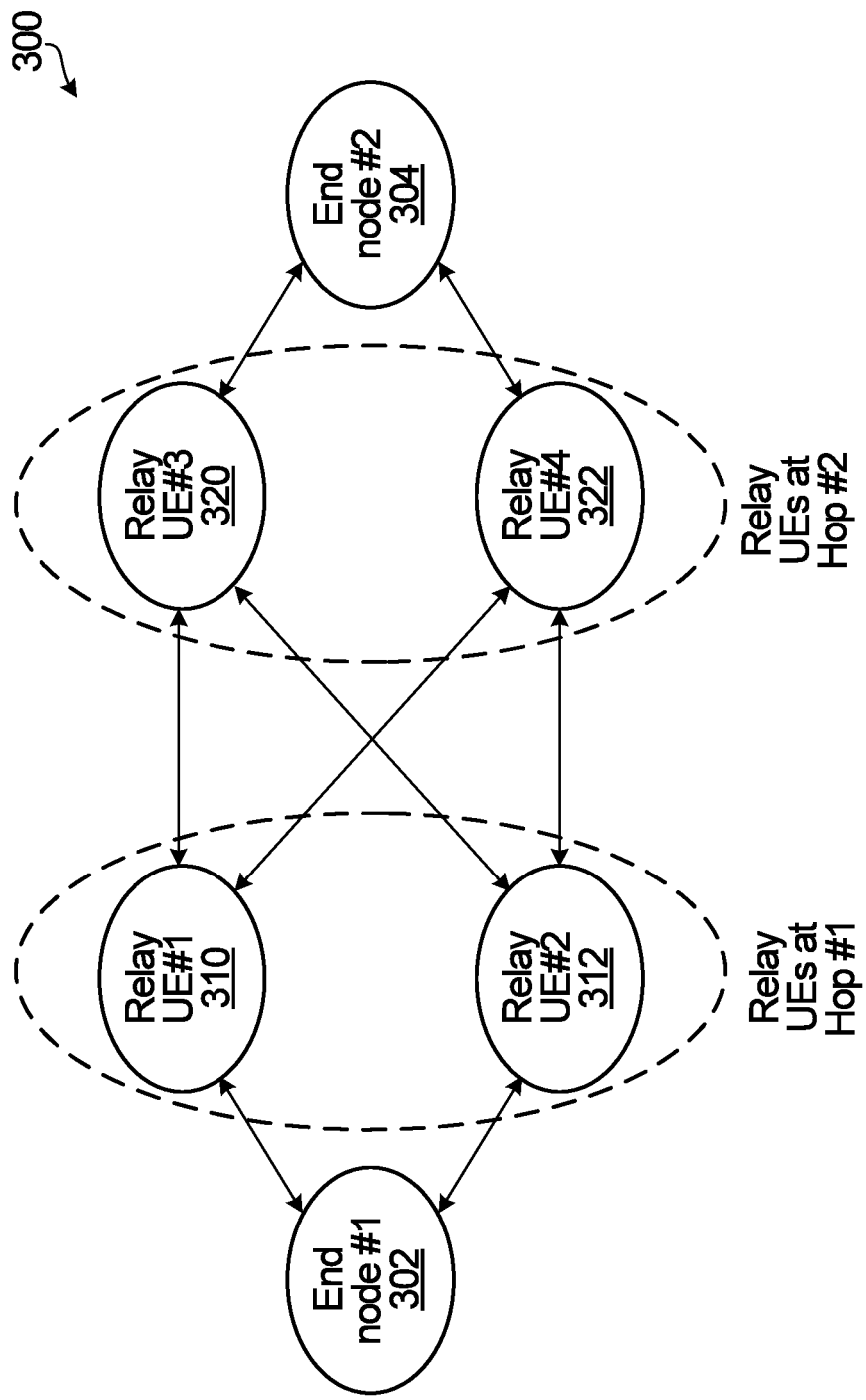
FIG. 3 is a block diagram illustrating another example of a multi-hop communication path.

FIG. 3 is a block diagram illustrating another example of a multi-hop communication path. The example 300 in FIG. 3 is similar in structure to the example in FIG. 2, but provides a more general example of a multi-hop communication path. As shown, the example in FIG. 3 includes an end node #1 at 302 and an end node #2 at 304, and subsets of relay UEs including one or more relay UEs for relaying data in each of two hops. Relay UE #1 and relay UE #2 are shown at 310, 312 relaying data for hop #1, and relay UE #3 and relay UE #4 are shown at 320, 322 relaying data for hop #2. In general, a subset of relay UEs that handle relaying of data in any hop may include one more relay UEs, and subsets may be the same or different sizes. The present disclosure is not limited to any particular number of relay UEs for any hop.

Relay UEs that are involved in forwarding data are referred to herein as relaying data "in" respective hops of multi-hop relay, but may also or instead be described as being "at" each hop. Multi-hop relay involves relaying data in multiple steps or hops, along a multi-hop communication path, between end nodes. In each hop, one or more relay UEs relay the data to either an end node or one or more relay UEs involved in relaying the data in a next hop. In some embodiments, a hop involves reception of data to be relayed, from one or more relay UEs or an end node, and transmission of that received data to one or more other relay UEs or another end node.

In FIG. 3, transmission could be initiated from either end node #1 or end node #2 and terminated at the other end node via the relay UE(s) at hop #1 and hop #2 in the example shown. In general, the relay UEs relay data in respective hops between the end nodes along a multi-hop communication path. The transmission from one end node to the other end node may go through one or more relay UEs during relay in each of multiple hops, and thus a communication path as shown in FIG. 3 is referred to herein as a multi-hop path or multi-hop relay, as opposed to single-hop paths or single-hop relay in which there is only one hop or only one subset of relay UEs between two end nodes.

The following should be noted in respect of FIG. 3:

Each end node could be a user device such as a UE or a network device such as a gNB, TRP, or another type of network node. FIG. 3 is therefore intended to encompass both multi-hop UE-to-network relay and UE-to-UE relay scenarios. UE-to-network is used herein as a general phrase that is intended to encompass communications in either direction between a UE and a network device, unless otherwise indicated.

A relay UE could be denoted as a CUE, because it cooperates to help an end node with transmission and/or reception. A relay UE as referenced herein is intended to encompass, for example, a Layer 1 (L1) relay UE, a Layer 2 (L2) relay UE, a Layer 3 (L3) relay UE, and other types of relay UEs. Relay UEs support at least forwarding of data, and may also support some form of data processing, such as decoding data to determine that data is to be relayed and is not destined to the relay UE itself. Other data processing, such as amplifying data before forwarding, may also or instead be supported by a relay UE. Relay UEs are not limited to these particular example operations Each link between a relay UE and either another relay UE or an end node could use, for example, a sidelink (e.g., PC5) air interface, a Uu link air interface, or another type of air interface (such as WiFi, Bluetooth, etc.).

The end node at which a data transmission is initiated can be referred to as a source node or source of traffic, while the end node at which a data transmission is terminated can be referred to as a destination node or target node.

Communications between two end nodes may be bidirectional. For example, end node #1 may transmit data to end node #2, and end node #2 may transmit data to end node #1. One node may therefore be the source node or the target node for different data transmissions.

In a multi-hop relay system, if following a conventional transmission protocol such as a protocol used on a Uu link, latency could be very high. For example, each relay UE may need a master UE or a network device such as a gNB to schedule a transmission, including any re-transmissions, before data can be relayed in a current hop toward the destination. Multi-link relay may also be quite unstable, in the sense that if transmission in any hop is not successful then the whole transmission could be abandoned. According to an aspect of the present disclosure, transmissions in each hop are coordinated in order to facilitate multi-hop relay transmission in a more timely manner. This could also allow the relay UE(s) to relay data in each hop in a more coordinated manner and thus improve throughput and reliability.

Regarding resource allocation for multi-hop relay, communication resources such as time-frequency resources can be pre-configured or pre-allocated, as sub-channels for example. A sub-channel is an allocatable block or subdivision of time-frequency resources in this example.

Figure 4A:
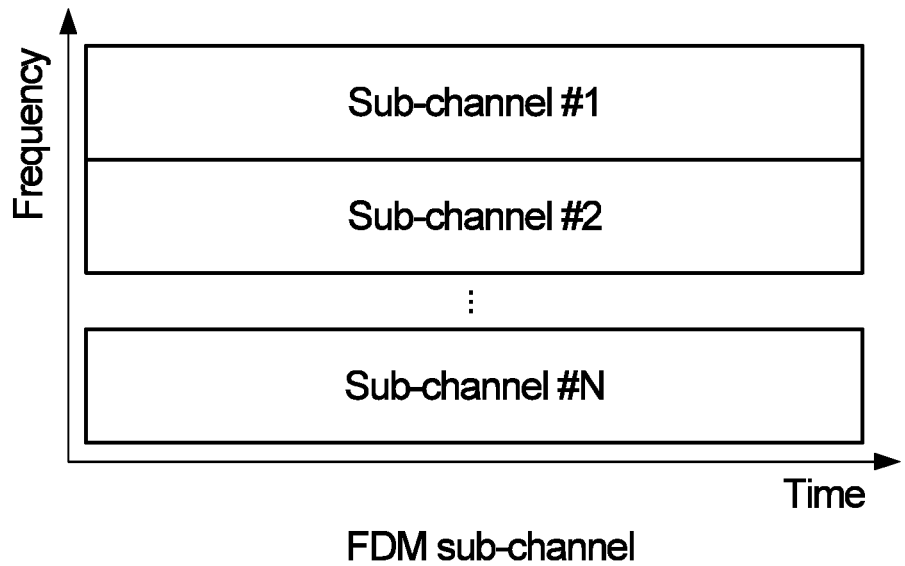
FIGS. 4A and 4B are time-frequency plots illustrating examples of sub-channel multiplexing.
Figure 4B:
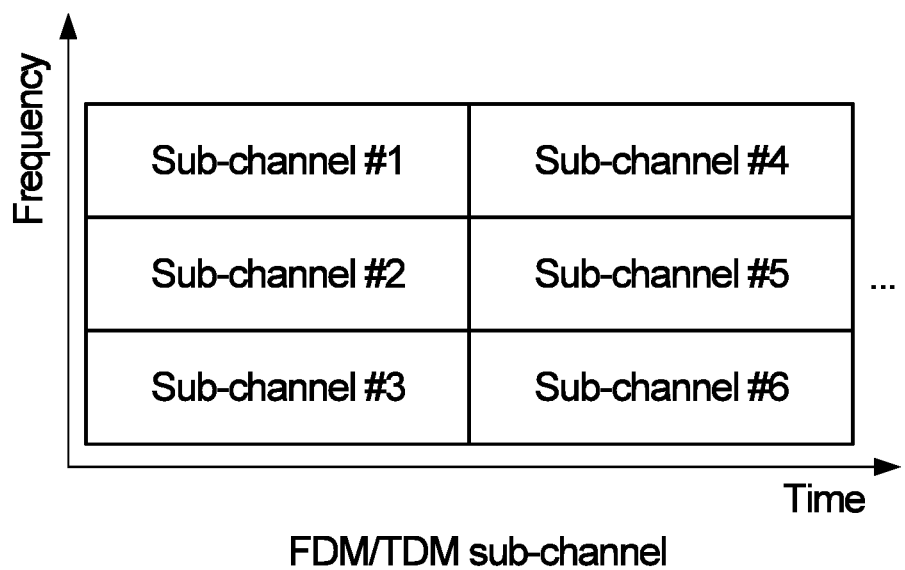

FIGS. 4A and 4B are time-frequency plots illustrating examples of sub-channel multiplexing. As shown in FIG. 4A, different sub-channels could be multiplexed by frequency in frequency division multiplexing (FDM). Other multiplexing examples include time division multiplexing (TDM) and code division multiplexing (CDM). Combinations are also possible, and FIG. 4B illustrates combined FDM and TDM.

One or more sub-channels, or more generally communication resources, can be configured in accordance with the following:
- for communications between an end node and each relay UE at a first hop;
- for communications between each pair of relay UEs at adjacent hops
- for communications between each relay UE at a final hop and an end node
- for communications in each direction for each of the above—e.g., for bidirectional communication between relay UE #1 and relay UE #3 in FIG. 3, different sub-channels could be allocated for communication in each direction, from relay UE #1→relay UE #3 and from relay UE #3→relay UE #1
- the same communication resources could be allocated to and shared for the above communications—e.g., sub-channel #1 could be allocated for relay UE #1→relay UE #3, and relay UE #1→relay UE #4, for the same sub-channel, in this example, to be shared by multiple communication links.

Another possible communication resource allocation for the example 300 in FIG. 3 is as follows:
- sub-channel #1 could be allocated for communication from relay UE #1 at hop #1→relay UE #3 at hop #2
- sub-channel #2 could be allocated for communication from relay UE #1 at hop #1→relay UE #4 at hop #2
- sub-channel #3 could be allocated for communication from relay UE #3 at hop #2→relay UE #1 at hop #1.

Other communication resource allocations are also possible.

Communication resources such as sub-channels can be allocated by a network device such as a gNB, or by a UE such as a master UE within a UE cooperation group or a source UE (SUE) that is to be assisted with a data transmission.

A communication resource allocation can be configured, for example, by higher layer signaling such as radio resource control (RRC) signaling.

Figure 5A:
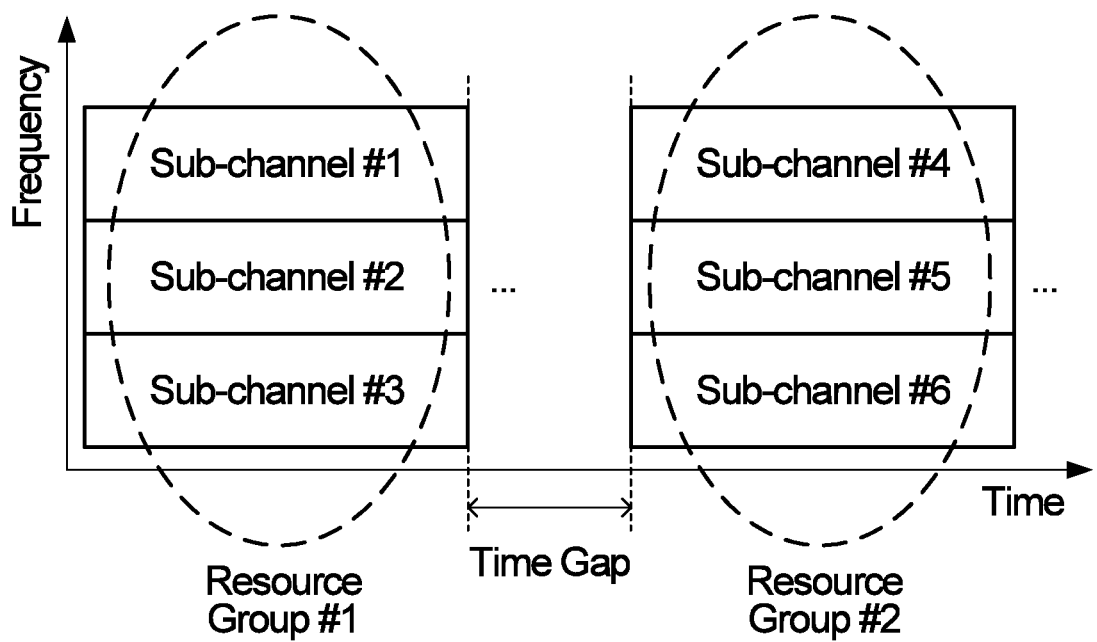
FIGS. 5A and 5B include time-frequency plots illustrating examples of resource groups and resource group allocation.
Figure 5B:
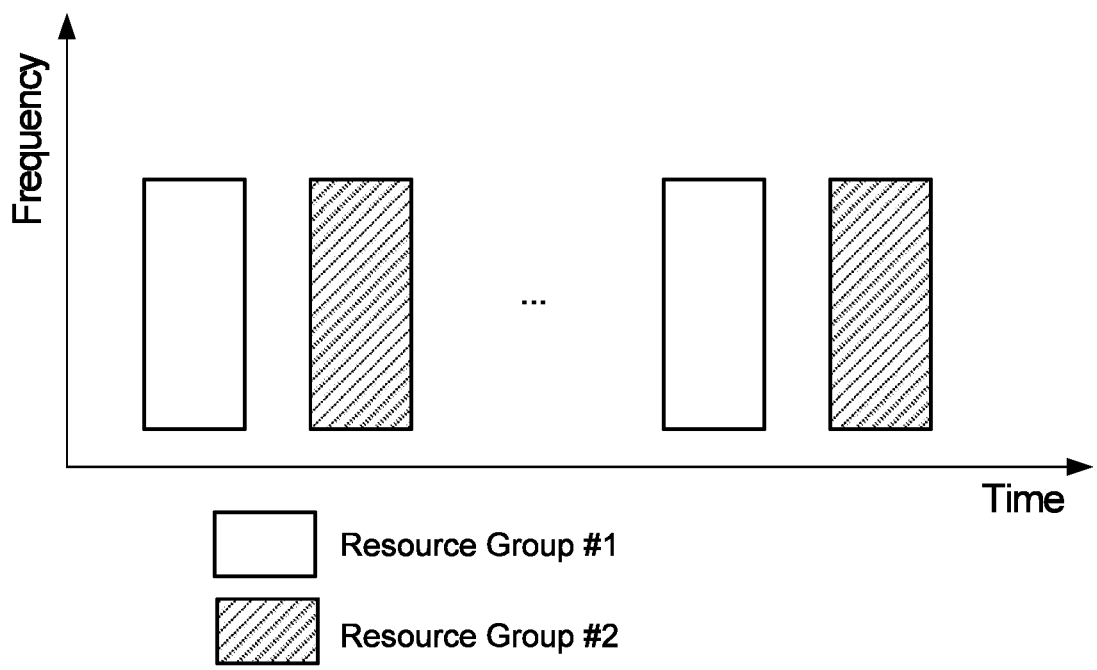

In some embodiments, to facilitate UE relay and cooperation, communication resources such as sub-channels with the same time slots could be grouped together to form a resource group, which may also be referred to as a resource set. In other words, a resource group could be configured, and could contain a number of sub-channels or other communication resources within the same time duration. FIGS. 5A and 5B include time-frequency plots illustrating examples of resource groups and resource group allocation. Allocation of such resource groups for multi-hop UE relay is also referred to herein as time-based allocation. An allocation is time-based in this context at least in the sense that resource groups share or partially share a time duration, and usage of resource groups is controlled or delineated based on time.

A resource group, or a subset thereof such as sub-channel(s) of the resource group for example, can be configured and allocated for a relay UE. Such an allocation may be for transmitting, receiving (also referred to as listening), or both transmitting and receiving by the relay UE.

Relay UEs at the same hop could be allocated with communication resources in the same group for transmitting or receiving.

Relay UEs at different hops, and end nodes, can be allocated with communication resources in different groups for transmitting or receiving. Thus, different time multiplexed resource groups could be configured for relay UEs at different hops.

In an embodiment, a time gap is configured between different resource groups allocated to a relay UE for reception and transmission. Such a time gap may be useful, for example, to provide time for the relay UE(s) at any hop to decode and forward data. A time gap is shown by way of example in FIG. 5A and could depend on relay UE capability of decoding/forwarding.

A resource group can be configured periodically, and different resource groups can be interlaced as shown in FIG. 5B.

Relay capability may impact resource allocation. For example, if a relay UE is subject to a half-duplex constraint, then time multiplexed resource groups may be used for transmitting and receiving. In other embodiments, a resource group for transmitting and receiving by a relay UE could potentially be frequency multiplexed or code multiplexed, or shared/overlapped. According to an aspect of the present disclosure, however, communication resource allocations are time-based. Communication resources within a resource group could be multiplexed with each other by frequency or code, as in the case of the resource groups multiplexed by frequency in the example shown in FIG. 5A, but the allocation is time-based as shown by way of example in FIG. 5B.

For multi-hop relay, to coordinate transmission between hops and potentially enable more efficient transmission with lower latency, a communication resource group or subset thereof could be allocated for transmission by the relay UE(s) at one hop and for reception by the adjacent end node(s) and relay UE(s) at a next consecutive hop. For example, with reference to FIGS. 3 and 5A, sub-channels #1 to #3 in FIG. 5A could be configured into resource group #1 and allocated to the relay UEs at hop #1 in FIG. 3, and also possibly to end node #2, for transmitting data during a first time period, and to the relay UEs at hop #2 and end node #1 for receiving data during the first time period. Similarly, sub-channels #4 to #6 in FIG. 5A could be configured into resource group #2 and allocated to the relay UEs at hop #2 in FIG. 3, and also possibly to end node #1, for transmitting data during a second time period, and to the relay UEs at hop #1 and end node #2 for receiving data during the second time period.

This example is illustrative of embodiments in which a resource group contains one or more resources that may be allocated for transmission or for reception by multiple relay UE(s) or end nodes that are at non-consecutive hops or not adjacent to each other. In the above example, one or more sub-channels of resource group #1 may be allocated to both a relay UE at hop #1 and end node #2 for transmitting data during the first time period, and one or more sub-channels of resource group #2 may be allocated to both a relay UE at hop #2 and end node #1 for transmitting data during the second time period.

A resource group allocation could instead be exclusive to a relay UE subset at a particular hop or to an end node. This would be different from the above example in that the sub-channels in resource group #1 are allocated only to the relay UEs at hop #1 in FIG. 3 and not to end node #2 for transmitting data during the first time period, and the sub-channels in resource group #2 are allocated only to the relay UEs at hop #2 and not to end node #1, for transmitting data during the second time period.

Figure 6:
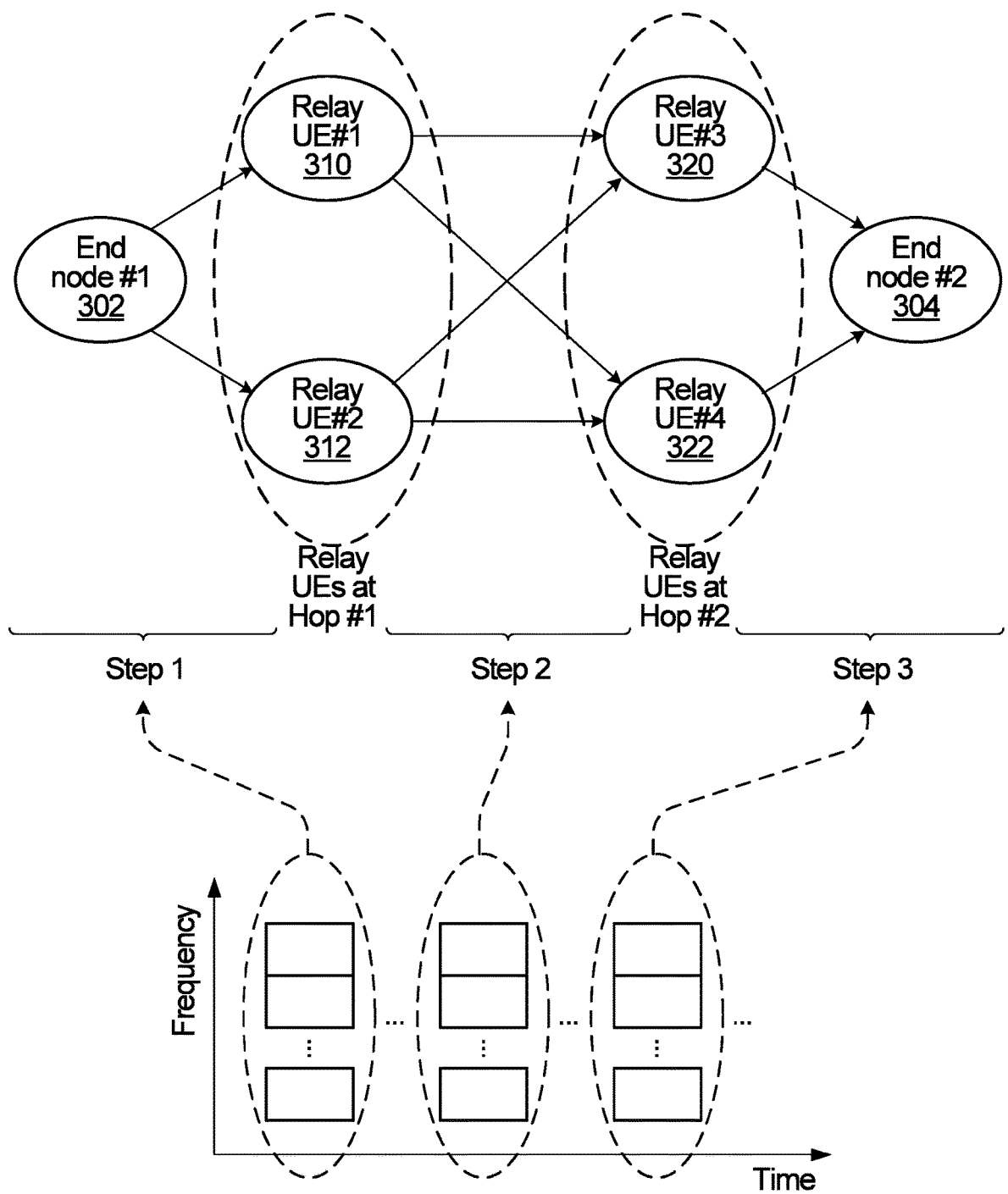
FIG. 6 includes a block diagram and a time-frequency plot illustrating another example of resource allocation.

FIG. 6 includes a block diagram and a time-frequency plot illustrating another example of resource allocation, for a transmission from end node #1 to end node #2 in the example shown in FIG. 3. For ease of reference, the end nodes and relay UEs from FIG. 3 are also shown in FIG. 6, but with directional arrows in FIG. 6 illustrating UE relay from end node #1 to end node #2.

In the example shown in FIG. 6, three resource groups are used.

For resource group #1, the resources can be allocated to end node #1, which is the source in this example, to transmit data to the relay UEs at hop #1. The same resources can also be allocated to the relay UEs at hop #1 for listening.

Regarding resource group #2, the resources in this resource group can be allocated to the relay UEs at hop #1 to transmit relay data to the relay UEs at hop #2 in this example, and also or instead to transmit relay data to end node #1 for relay in the opposite direction. The resources in resource group #2 can also be allocated to the relay UEs at hop #2 (and/or end node #1 for relay in the opposite direction) for listening. As shown in FIG. 6, there is a time gap between resource group #1 and resource group #2, to accommodate data decoding and possibly other data processing by the relay UEs at hop #1 before the data is relayed by those relay UEs.

Resource group #3 includes resources that can be allocated to the relay UEs at hop #2 to transmit data to end node #2, and also or instead to transmit relay data to the relay UEs at hop #1 for relay in the opposite direction. The resources in resource group #3 can also be allocated to end node #2 (and also or instead to the relay UEs at hop #1 for relay in the opposite direction) for listening. There is a time gap between resource group #2 and resource group #3, to accommodate data decoding and possibly other data processing by the relay UEs at hop #2 before the data is relayed by those relay UEs. The time gaps between resource groups may be the same or different. Different time gaps may be preferred, for example, for deployments in which relay UEs at different hops have different capabilities or otherwise are expected to require different amounts of time to decode data and prepare data for relaying.

Several of the above examples of multi-hop relay illustrate relay UEs at each hop as having links or connections with any relay UE at an adjacent hop. For example, with reference to FIG. 3, relay UE #1 at hop #1 could have connections with relay UE #3 and relay UE #4 at hop #2, and relay UE #2 at hop #1 could have connections with relay UE #3 and relay UE #4 at hop #2. Even though this may not be the case all implementations, such a general assumption could facilitate UE cooperation for multi-hop relay scenarios without the need to apply special implementation-specific design. For example, the transmission from a relay UE at one hop (e.g., relay UE #1 at hop #1 in FIG. 3) could be received (listened to) by some or all relay UEs at a next hop (e.g., relay UE #3 and relay UE #4 at hop #2), thus potentially improving the probability of successful reception at the next hop and in the end potentially improving overall latency, reliability, and performance of multi-hop relay.

Figure 7:
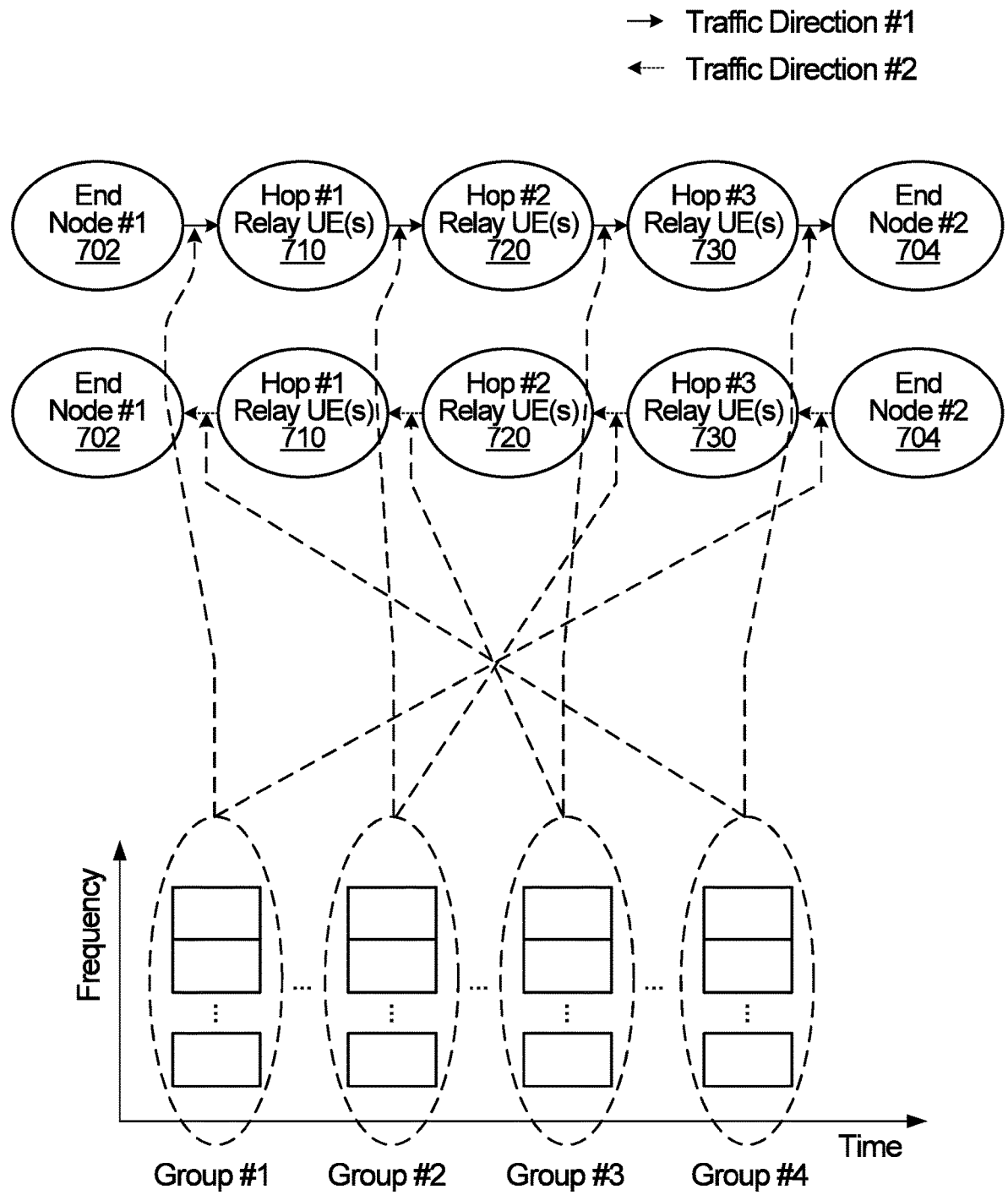
FIG. 7 includes a block diagram and a time-frequency plot illustrating another example of resource allocation for multi-hop relay with bidirectional traffic.

FIG. 7 includes a block diagram and a time-frequency plot illustrating another example of resource allocation for multi-hop relay with bidirectional traffic. End nodes 702, 704 and one or more relay UE(s) 710, 720, 730 at each of three hops are shown twice at the top of FIG. 7 to facilitate indications as to how communication resources are allocate for each direction in this example.

With bidirectional traffic between the two end nodes 702, 704 as shown, there is traffic in a direction #1 from end node #1→end node #2 and traffic in a direction #2 from end node #2→end node #1. Communication resources can be allocated together for relay UEs with half-duplex capability, and can be re-used for non-consecutive or non-adjacent hops in accordance with the half-duplex limitation.

Table 1 below shows an example allocation for relay UE(s) at three hops, with bidirectional traffic and four resource groups. In Table 1, "ED" stands for end node, "Hop #" refers to the relay UE(s) 710, 720, 730 at that particular hop, and hop index x is counted from ED #1→ED #2 for convenience as shown in FIG. 7. (e.g., relay UEs 710, 720 and 730 are at Hop #1, Hop #2 and Hop #3 respectively).

TABLE 1

Example of resource allocation for multi-hop relay with bidirectional traffic

|  | Resource Group #1 | Resource Group #2 | Resource Group #3 | Resource Group #4 |
| --- | --- | --- | --- | --- |
| Direction #1 | ED#1 -> Hop#1 | Hop#1 -> Hop#2 | Hop#2 -> Hop#3 | Hop#3 -> ED#2 |
| Direction #2 | ED#2 -> Hop#3 | Hop#3 -> Hop#2 | Hop#2 -> Hop#1 | Hop#1 -> ED#2 |

Although above-mentioned examples refer to single directional or bidirectional traffic transmission, the resource(s) for HARQ-ACK feedback, on physical sidelink feedback channel (PSFCH) for example, could be allocated in a similar manner but for transmission in the opposite direction to the traffic transmission.

These resource allocation examples and embodiments for multi-hop relay with UC are illustrative of pre-configuring resource groups in time and allocating resource groups to end nodes and relay UEs at different hops. A potential benefit is to enable efficient multi-hop relay transmission and reception with lower latency and higher reliability. Such resource allocation as disclosed herein may also enable UE cooperation among relay UEs at different hops, to potentially improve performance and coverage.

Regarding communication procedure, such procedure for multi-hop relay with UC can be divided into several steps or phases.

With reference again to FIG. 6, consider an example in which end node #1 is the source. In a Step 1 of a communication procedure, after communication resource allocation has been completed, end node #1 transmits a packet, or more generally data, or a package of data, to one or more of the relay UEs 310, 312 at hop #1 using the allocated resources, in this case sub-channels in resource group #1.

The relay UEs 310, 312 at hop #1 will monitor the allocated sub-channels on resource group #1. In a Step 2 the relay UEs 310, 312 at hop #1 try to decode the packet if received from end node #1. Decoding is during the time gap between resource group #1 and the resource group #2 allocated to transmission by the hop #1 relay UEs in this example. Decoding by relay UEs includes identifying a target or destination, such as a destination ID, of a packet. If the packet from end node #1 is decoded successfully and it is identified that the packet is intended for further relay to one or both of the relay UEs 320, 322 at hop #2, then one or both of the relay UEs 310, 312 at hop #1 will forward the packet to one or both of the relay UEs 320, 322 at hop #2, using a routing table for example, and the allocated sub-channels in resource group #2.

The relay UEs 320, 322 at hop #2 listen to transmissions on one or more resources, such as one or more sub-channels, in resource group #2 and try to decode the packet if detected. For example, relay UE #3 at hop #2 may monitor transmissions from relay UE #1 and relay UE #2 at hop #1 and try to decode the packet from one or both transmissions if detected.

The decoding and further forwarding or relaying in Step #2 may be repeated for each additional hop if there are more than two hops.

The forwarding or relaying in Step #2, and possibly Step #1, could be broadcast, multicast, or unicast. For example, relay UE #1 in hop #1 could broadcast forwarded data so that relay UE #3 and relay UE #4 at hop #2 could both listen for the packet and receive it. Alternatively, forwarding or relaying may use multicast or unicast communication between relay UEs at different hops. For example, relay UE #1 at hop #1 could transmit forwarded data to relay UE #3 only, to relay UE #4 only, or to both relay UE #3 and relay UE #4 at hop #2.

If the packet is decoded successfully at hop #2, which is the last hop in this example, then the procedure continues to a Step 3, in which one or more of the relay UEs 320, 322 at hop #2 forward the packet to the target node, which is end node #2, using allocated sub-channels in resource group #3.

A communication procedure for multi-hop relay with resource allocation as disclosed herein may allow more efficient multi-hop relay transmission and reception with lower latency and higher reliability, and may also enable UE cooperation among relay UEs at different hops to potentially further improve performance and coverage of a multi-hop relay system.

Figure 8:
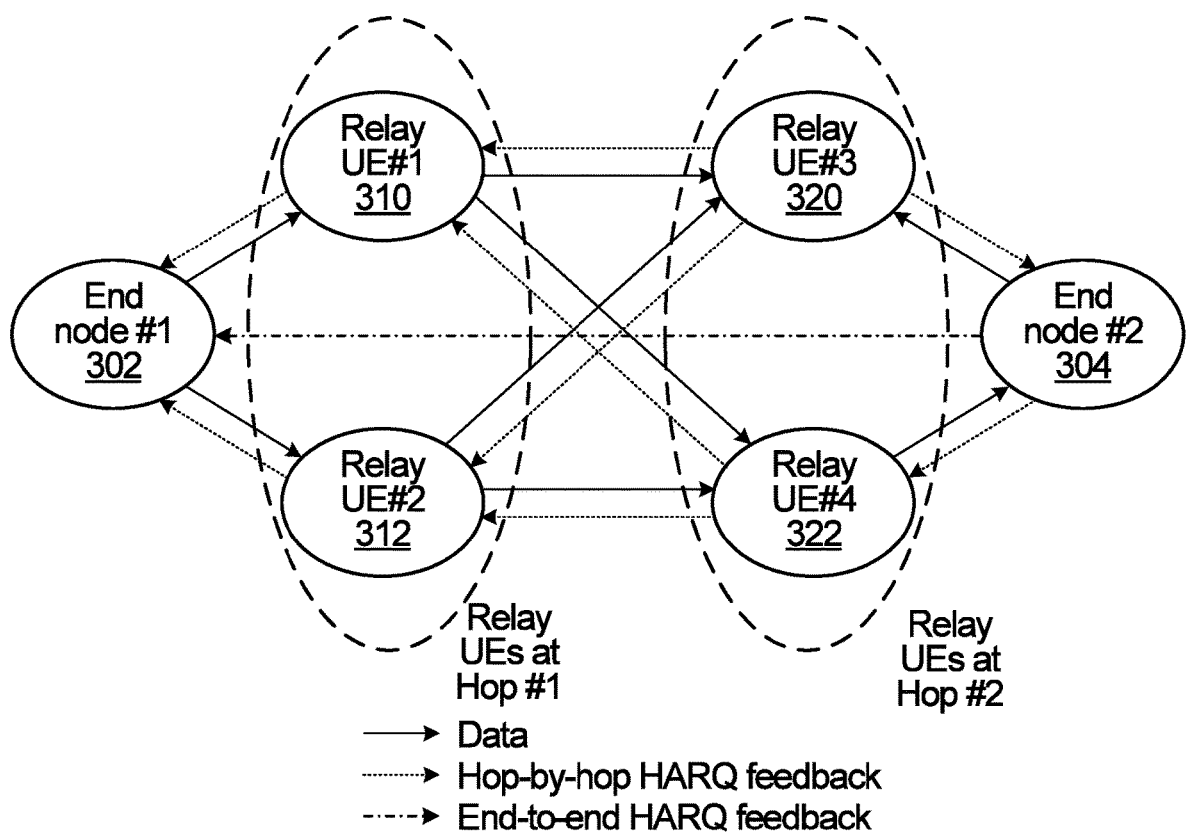
FIG. 8 is a block diagram illustrating examples of Hybrid automatic repeat request (HARQ) feedback.

The present disclosure also contemplates HARQ processes for multi-hop relay with UC. Two types or stages of HARQ are described herein by way of example. These include a hop-to-hop HARQ process and an end-to-end HARQ process. FIG. 8 is a block diagram illustrating examples of HARQ feedback for these two types of HARQ, using the same example path as in FIG. 3. Hop-to-hop HARQ feedback is between relay UEs and end nodes or other relay UEs at adjacent hops (also referred to as hop-by-hop feedback), and end-to-end feedback is between end nodes.

Figure 9:
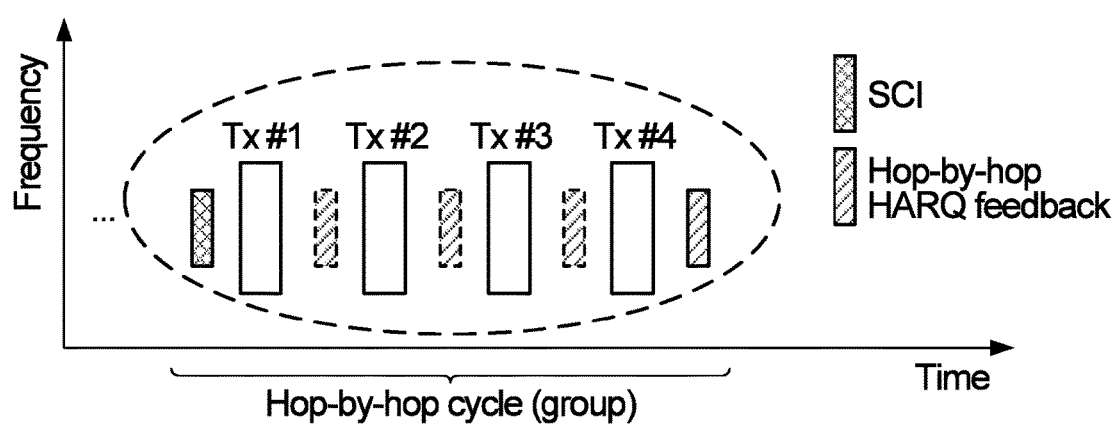
FIG. 9 is a time-frequency plot illustrating an example of a hop-to-hop HARQ process.

FIG. 9 is a time-frequency plot illustrating an example of a hop-to-hop HARQ process. In general, a hop-to-hop cycle may contain a configured number of resources for packet forwarding. These resources could be consecutive or non-consecutive in time, and are non-consecutive in the example shown in FIG. 9. In the example of the hop-to-hop cycle in FIG. 9, resources are configured for four HARQ transmission (Tx) opportunities, for one transmission and up to three re-transmissions, with each transmission followed by a HARQ feedback. A hop-to-hop cycle contains resources for hop-by-hop HARQ feedback opportunities. Alternatively, consecutive resources may be allocated for repeated packet forwarding followed by one HARQ feedback.

Although the example in FIG. 9 also includes a resource carrying SCI, a relay UE at a previous hop or a source node may transmit a number of hop-to-hop transmissions carrying the same packet or different redundant versions (RVs) of the same packet according to a pre-configuration of resources, without an SCI carrying scheduling information.

Hop-by-hop HARQ feedback could be transmitted by a relay UE at a next hop or a destination node after each hop-to-hop transmission (packet forwarding), as shown in FIG. 8. In some embodiments, hop-by-hop HARQ feedback is transmitted all the way back to a source end node, and not only between relay UEs at adjacent hops.

HARQ feedback could be sent after successful decoding of a packet from a previous hop or source end node. Alternatively, HARQ feedback (acknowledgement (ACK) or negative acknowledgement (NACK)) could be sent after a pre-configured timing window, such as the duration of a hop-to-hop transmission cycle, expires or after a number of repeated transmissions finishes.

No HARQ feedback could be considered as NACK in some embodiments.

HARQ feedback could be sent separately to each relay UE at a previous hop, or broadcast, multicast, or otherwise sent to relay UEs at the previous hop.

The relay UE(s) at a previous hop, or a source node, may stop packet forwarding after receiving an HARQ/ACK feedback from a relay UE at the next hop or from the destination node in the case of a last hop relay UE. Otherwise, a relay UE or source node could continue data forwarding, for repeated or different RV versions, until a timing window expires.

Figure 10:
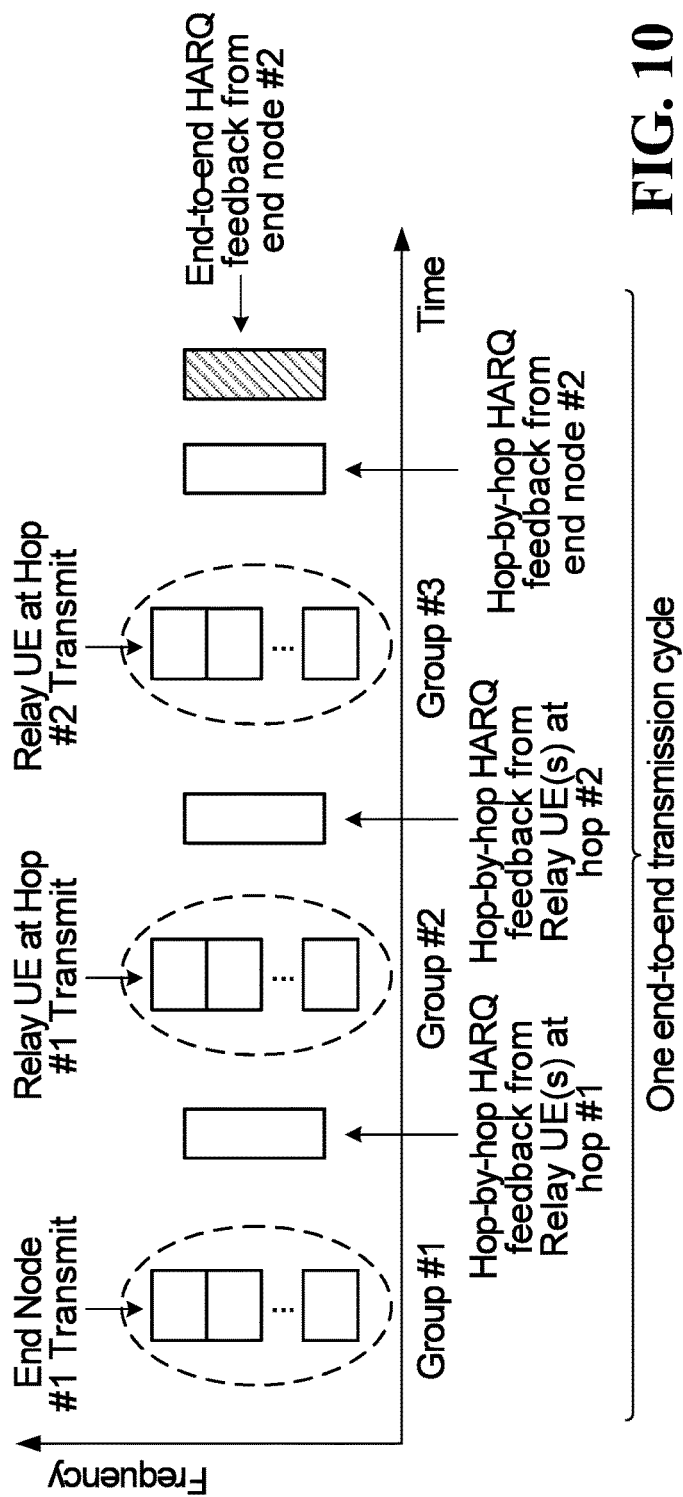
FIG. 10 is a time-frequency plot illustrating an example of an end-to-end HARQ process.

FIG. 10 is a time-frequency plot illustrating an example of an end-to-end HARQ process. In FIG. 10, end node #2 is the end node which is the target of the packet, and transmits HARQ feedback to the end node #1 which is the source of the packet. A resource allocation for the end-to-end HARQ feedback is shown at the right-hand side of FIG. 10.

The end-to-end HARQ feedback may be forwarded by one or more relay UEs at each hop, from end node #2 to end node #1. The HARQ feedback may contain an ACK signal and an identifier such as a source ID, for example.

HARQ feedback need not always be transmitted. For example, no HARQ feedback before a timing window expires could be considered as NACK.

After receiving a HARQ/ACK, the end node which is the source could start a new transmission; otherwise, it could start a re-transmission.

One end-to-end transmission cycle, which may also be referred to as a transmission opportunity or occurrence, could be defined for one end-to-end transmission between two end nodes, and may include a number of TDM'd resource groups or hop-to-hop transmission cycles respectively allocated for each hop, as well as configuration for HARQ feedback. As shown in FIG. 10, an end-to-end HARQ process could include multiple hop-to-hop HARQ processes, one for transmission at each hop.

An end-to-end HARQ process could contain one or more end-to-end transmission cycles for original transmission and re-transmission of a packet between two end nodes. FIG. 10 illustrates one transmission cycle for an end-to-end HARQ process, but in other embodiments an end-to-end HARQ process includes multiple cycles as shown in FIG. 11.

Figure 11:
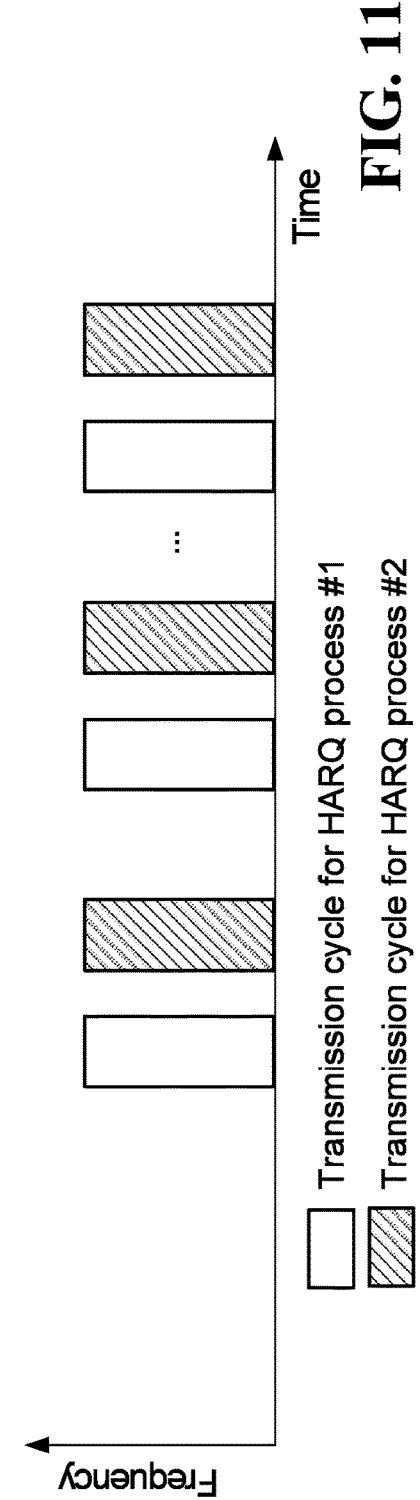
FIG. 11 is a time-frequency plot illustrating multiple end-to-end HARQ processes.
Figure 12:
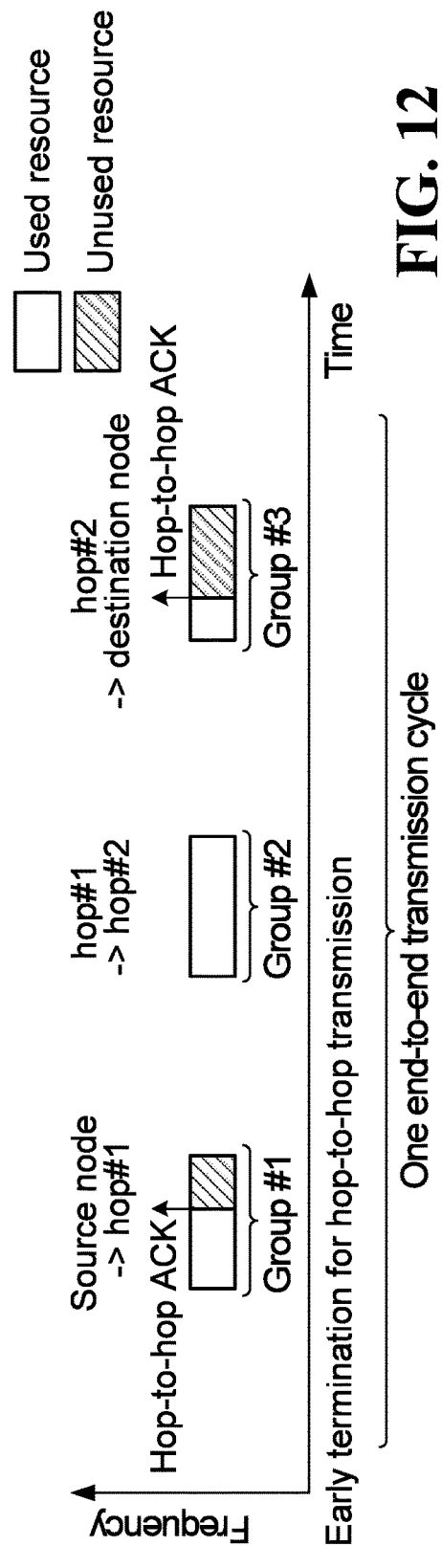
FIG. 12 is a time-frequency plot illustrating an example of a hop-to-hop HARQ process with early termination.
Figure 13:
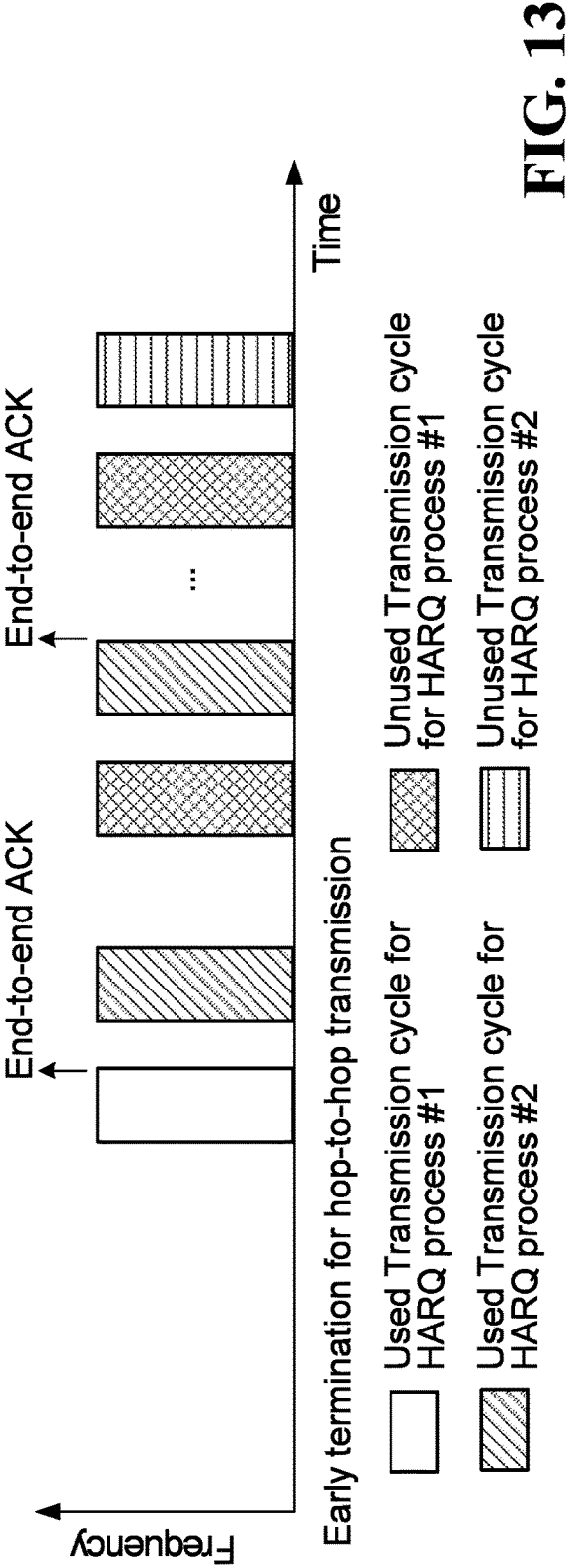
FIG. 13 is a time-frequency plot illustrating multiple end-to-end HARQ processes with early termination.

FIG. 11 is a time-frequency plot illustrating multiple end-to-end HARQ processes. Resources may be allocated for transmission cycles of multiple HARQ processes associated with different packets, for example. In FIG. 11, each end-to-end HARQ process has at least three cycles, and each cycle may be as shown in FIG. 10. If an end-to-end HARQ process is pre-configured, then configured resources could be wasted if a transmission is successful before all configured re-transmission opportunities have been used, or in other words if the HARQ process finishes early. Also, unnecessary re-transmissions consume transmitter power and can cause interference to other transmissions. To ease such issues, an early termination mechanism could be used for a HARQ process for multi-hop relay. FIG. 12 is a time-frequency plot illustrating an example of a hop-to-hop HARQ process with early termination. FIG. 13 is a time-frequency plot illustrating multiple end-to-end HARQ processes with early termination.

Configured resources for hop-to-hop HARQ and end-to-end HARQ with multi-hop relay allow repeated data forwarding to facilitate fast relay transmission with low latency and higher reliability. However, if the UE at a next hop or a destination node has already decoded the data successfully, then the data forwarding according to configured re-transmissions could be terminated early, to potentially reduce interference, save power, or improve overall system performance.

To achieve this, for hop-to-hop HARQ, if decoding is successful then a hop-to-hop HARQ ACK could be sent immediately from the relay UE at the next hop or from the destination node to the relay UE at a previous hop or source node, before a current timing window expires. After receiving an ACK feedback, the relay UE at the previous hop could flush a buffer for the hop-to-hop HARQ process or otherwise terminate the HARQ process, and prepare for another transmission. The resource(s) configured for any further HARQ re-transmissions as part of the HARQ process could be used by the relay UE for another transmission, or used by another relay UE at the same hop. Unused resources are illustrated in FIG. 12, in which the HARQ processes for two of the three hops in the example are terminated early, in response to receiving an ACK.

For end-to-end HARQ, after the source node receives and end-to-end HARQ ACK, it could flush a buffer for the end-to-end HARQ process or otherwise terminate the HARQ process, and any configured but unused resource(s) may be used for other transmissions. This is illustrated in in FIG. 13, in which resources for only the first transmission cycle in example HARQ process #1 is used for an initial transmission and then the process is terminated early in response to receiving an end-to-end ACK, and similarly resources for only the first two transmission cycles in example HARQ process #2 are used for an initial transmission and one re-transmission and then the process is terminated early in response to receiving an end-to-end ACK.

Figure 14:
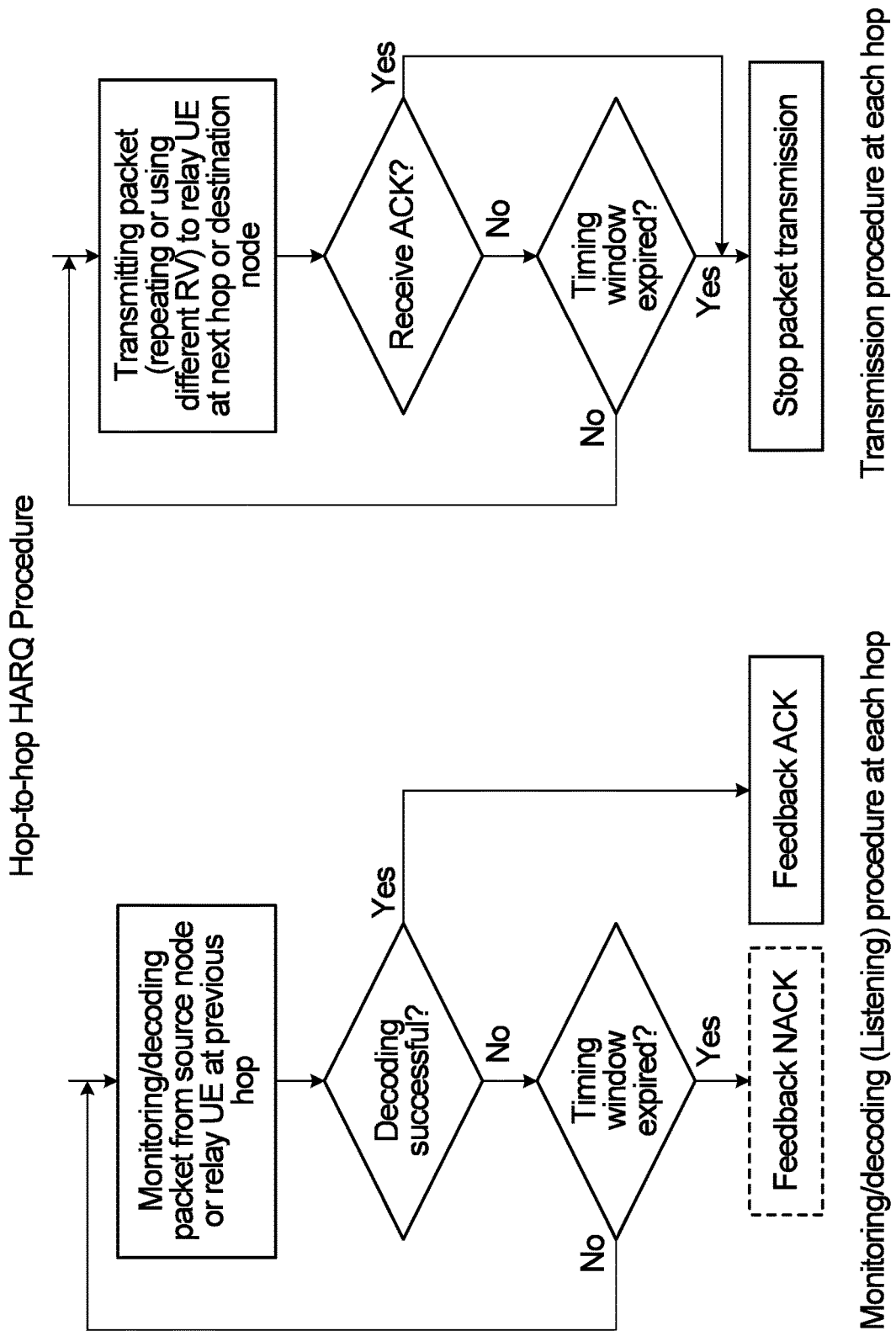
FIG. 14 includes flow diagrams illustrating an example hop-to-hop HARQ process.

FIG. 14 includes flow diagrams illustrating an example hop-to-hop HARQ process. Monitoring, decoding, and feedback operations, including optional NACK feedback, at each hop are shown at the left-hand side of FIG. 14. Transmission procedure at each hop is shown at the right-hand side of FIG. 14, including early termination at the bottom.

Figure 15:
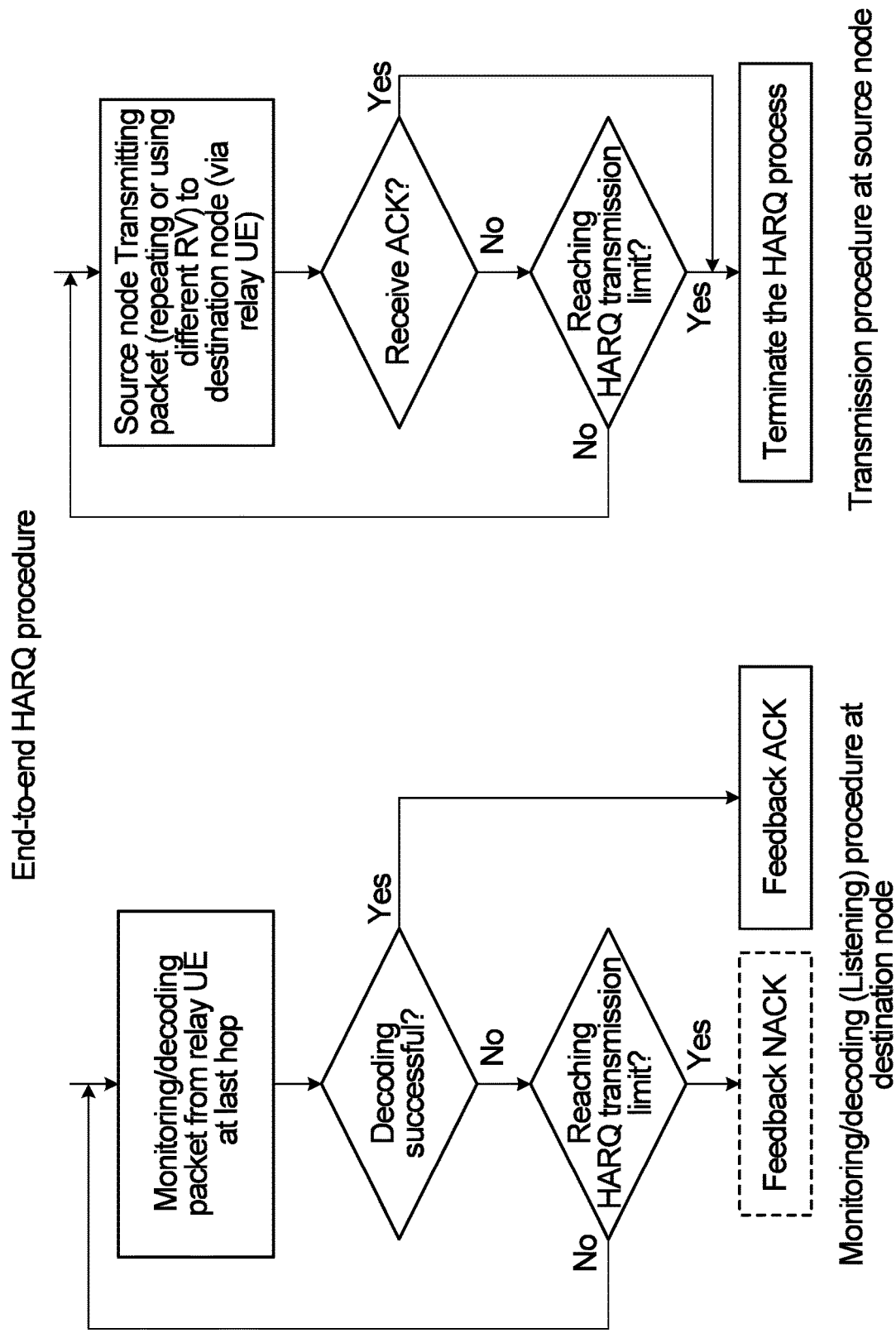
FIG. 15 includes flow diagrams illustrating an example end-to-end HARQ process.

FIG. 15 includes flow diagrams illustrating an example end-to-end HARQ process. Monitoring, decoding, and feedback operations, including optional NACK feedback, at a destination node are shown at the left-hand side of FIG. 15. Transmission procedure at a source node is shown at the right-hand side of FIG. 15, including early termination at the bottom.

The examples above encompass two types or stages of HARQ process for multi-hop relay, including a hop-to-hop HARQ process and an end-to-end HARQ process. These two stages of HARQ process may be used independently, or combined together to facilitate efficient data transmission/forwarding for multi-hop relay. Early HARQ process termination may avoid waste of configured resources and reduce the power consumption and interference, without compromise of performance because a HARQ process is terminated early only if data has already been successfully decoded. Configured HARQ resources may be re-used for transmission of other data, by the same relay UE(s) or one or more other relay UEs, after early termination.

Variations in HARQ processes are also possible. For example, although the examples discussed in detail above refer to hop-by-hop feedback and end-to-end feedback, in other embodiments hop-by-hop feedback need not be sent only to a relay UE at a previous hop. Hop-by-hop feedback could also or instead be forwarded all the way back to the source node.

Turning now to signaling, different alternatives could be considered to signal resource allocation for multi-hop relay with UC.

Figure 16:
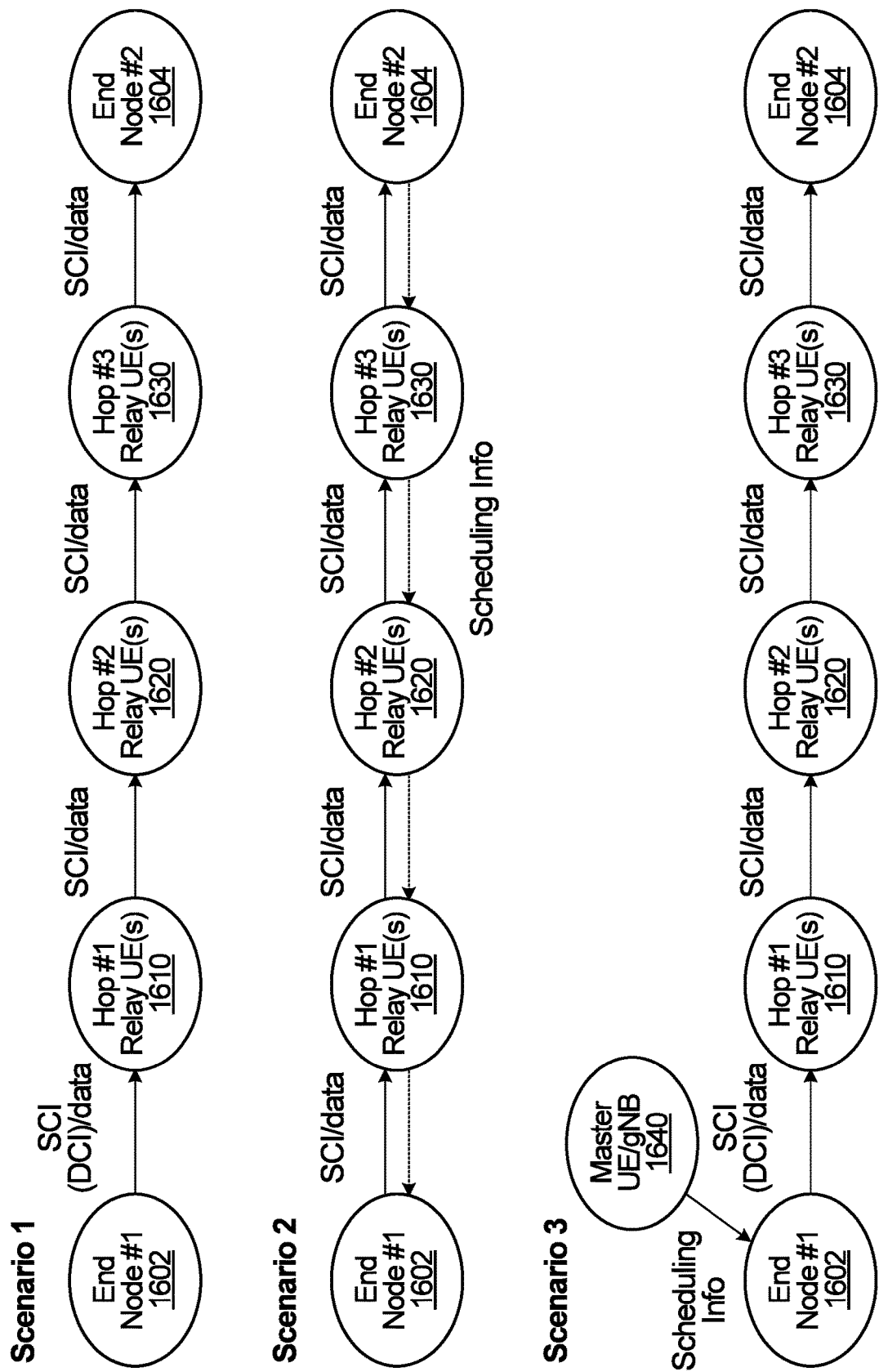
FIG. 16 is a block diagram illustrating an example of resource allocation by dynamic signaling.

FIG. 16 is a block diagram illustrating an example of resource allocation by dynamic signaling. In this example, resource allocation/scheduling uses dynamic signaling such as downlink control information (DCI) and/or sidelink control information (SCI) to the relay UE(s) and end nodes. DCI may be used, for example, on Uu link between a network device as an end node and the relay UE(s) at a first hop. SCI may be used on sidelink (SL) between relay UE(s) or between relay UE(s) and the target UE as an end node at different hops.

Three scenarios are illustrated in FIG. 16, each with end nodes 1602, 1604 and one or more relay UE(s) 1610, 1620, 1630 at each of three hops. A master UE or gNB 1640 is also shown for scenario 3.

In general, communication resources could be allocated by a gNB, by a master UE, or by an end node, for example. This type of allocation could be used for multi-hop UE-to-network relay or in multi-hop UE-to-UE relay.

The resource allocation, scheduling, or both, for one end-to-end transmission cycle could be dynamically signaled.

In an embodiment, each relay UE 1610, 1620, 1630 at each hop would decode DCI/SCI and try to decode data traffic. If the data traffic can be decoded successfully, then the relay UE forms an SCI that indicates remaining resource allocation and scheduling info and re-encodes the data before transmitting them to relay UE at a next hop or a destination node.

In some embodiments, each relay UE is able to schedule its packet forwarding to the next hop, and the scheduling and resource allocation is not determined by a gNB or a master or an end node.

For scenario 1 in FIG. 16, end node #1 is the source node, and it is the source node (end node #1 in this example) that conducts resource allocation/scheduling and transmits the resource allocation/scheduling to other relay UEs and end node using dynamic signaling.

In scenario 2, end node #2 is the destination node, and it is the destination node (end node #2 in this example) that conducts resource allocation/scheduling and transmits the resource allocation/scheduling to source node (e.g., end node #1) and other relay UEs using dynamic signaling.

Scenario 3 illustrates an example in which the resource allocation/scheduling is conducted at another node, shown as the master UE or gNB 1640, which is not part of the transmission (relaying) link. The master UE or gNB 1640 then transmits the resource allocation/scheduling to the source node (e.g., end node #1) and other relay UEs using dynamic signaling.

According to another embodiment, communication resources could be allocated by higher-layer configuration, potentially with other scheduling information and signaling to the relay UEs and end nodes.

For example, resource allocation, and possibly scheduling, could be configured by a network device such as a gNB or by a UE such as a master UE. This could be used for multi-hop UE-to-network relay or in multi-hop UE-to-UE relay.

While the scenarios shown in FIG. 16 include examples where some or all of the nodes (relay UEs and end nodes) are "out of coverage" of a network device, necessitating SCI to signal the allocated communication resources, other scenarios not shown could also include examples where all or some of the nodes are "in coverage" of the network device. Accordingly, where all or some of the nodes are in coverage, it would be possible (and potentially preferable) to additionally or alternatively signal the allocated communication resources via DCI or a combination of DCI and SCI to each of the nodes.

Figure 17:
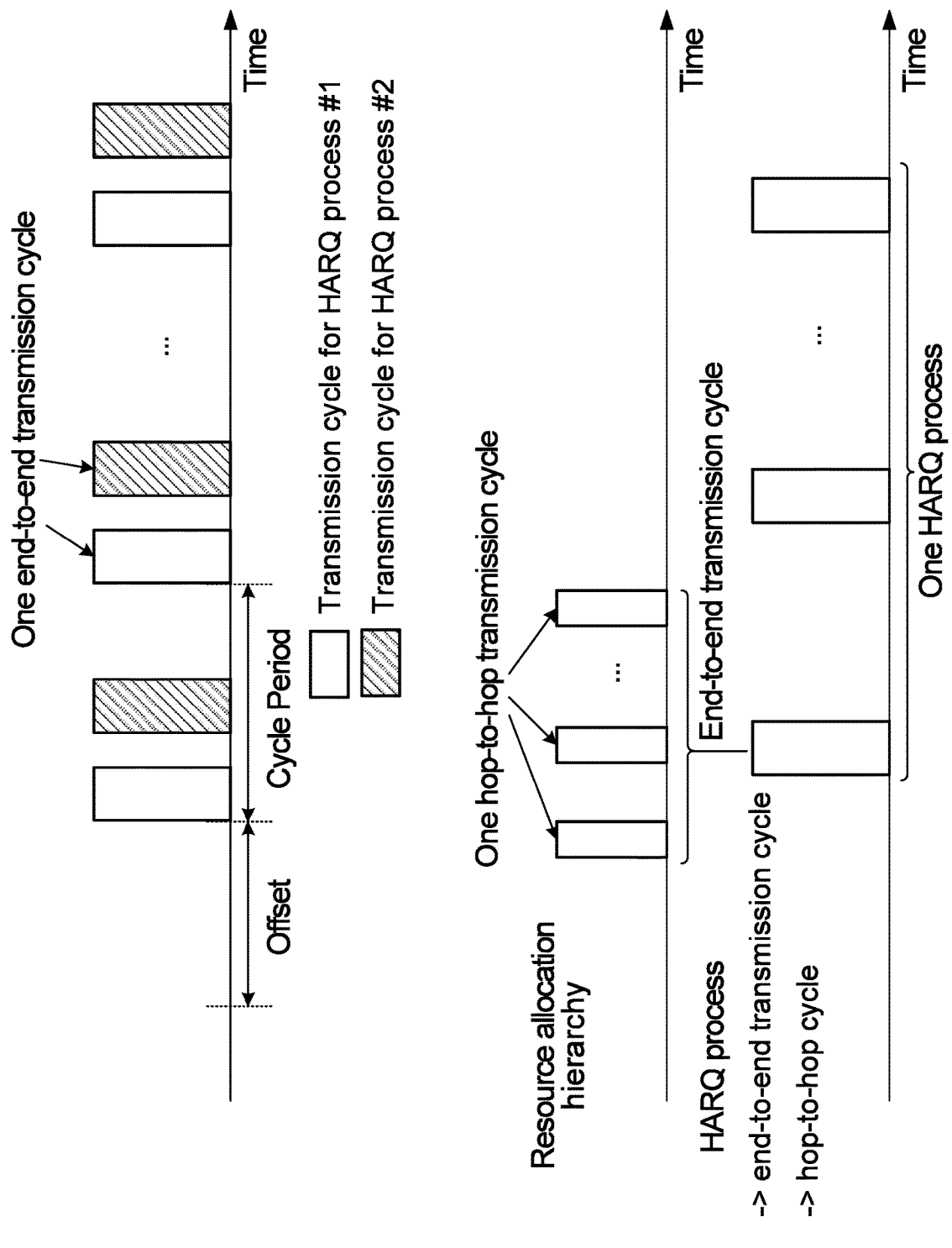
FIG. 17 illustrates an example of resource allocation by higher-layer configuration.

FIG. 17 illustrates an example of resource allocation by higher-layer configuration. As shown, a resource allocation may contain an offset and cycle period of one or more end-to-end HARQ processes. Each HARQ process may contain one or more end-to-end transmission cycles.

One end-to-end transmission cycle configuration may contain timing and resource allocation for one or more hop-by-hop transmissions with hop-by-hop feedback and end-to-end feedback.

Other scheduling information may include, for example, one or more of: modulation and coding scheme (MCS) and HARQ process ID.

One or more resources could be configured for each relay UE at each hop following the same timeline to facilitate UE cooperation. For example, the relay UE(s) at the same hop may be allocated with resources (sub-channels for example) in the same resource group for transmitting or listening.

Resource allocation may be hierarchical in some embodiments. For example, resource allocation may involve first allocating resources for one or more end-to-end cycles, and then within each end-to-end cycle, allocating resources for one or more hop-to-hop cycles.

Figure 18:
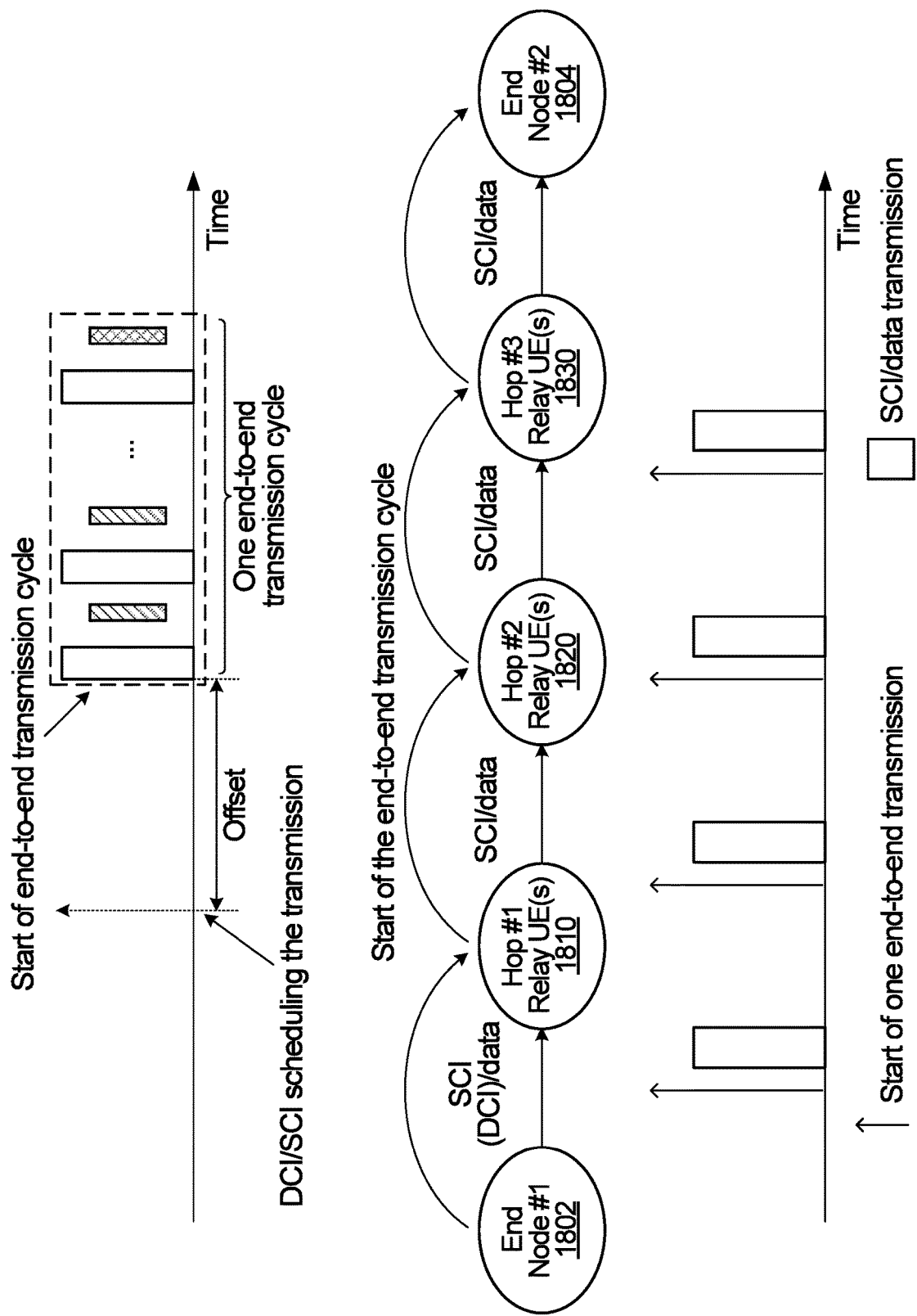
FIG. 18 illustrates an example of resource allocation by both higher-layer configuration and dynamic signaling.

A further embodiment involves resource allocation by both higher-layer configuration and dynamic signaling, such as DCI/SCI to the relay UEs and end nodes as shown by way of example in FIG. 18 using a three-hop path with one or more relay UEs 1810, 1820, 1830 at each hop between two end nodes 1802, 1804.

Resources could be allocated and configured by a network device such as a gNB, or by a master UE for example, and could be used in downlink and/or uplink for multi-hop UE-to-network relay, and could also or instead be used in multi-hop UE-to-UE relay.

The resource allocation may contain a configuration for resource allocation for one or multiple end-to end transmission cycles. The configuration can be signaled to the relay UEs using higher-layer signaling such as RRC, for example.

The start of a configured end-to-end transmission cycle could be dynamically indicated. For example, an indication of the start could be contained in DCI/SCI scheduling a transmission, or as an offset from a transmission of the DCI/SCI that schedules the transmission. Dynamic signaling could be transmitted from a source end node, such as end node #1 in FIG. 18.

Information indicative of the start of end-to-end transmission could be broadcast or otherwise relayed to relay UEs at a next hop and ultimately to an end node. Such information could be signaled in SCI for each hop-to-hop transmission, for example. In another embodiment, start information could be signaled separately from regular SCI on each hop. For example, start information could be broadcast, multicast, or unicast to all relay UEs and end nodes before the actual SCI/data arrives at each hop. The relay UEs could use this information to determine the timing and resource(s) for transmission or listening based on the configuration of an end-to-end transmission cycle.

The DCI/SCI at each hop may carry other scheduling information, such as MCS and/or HARQ process ID.

Figure 19:
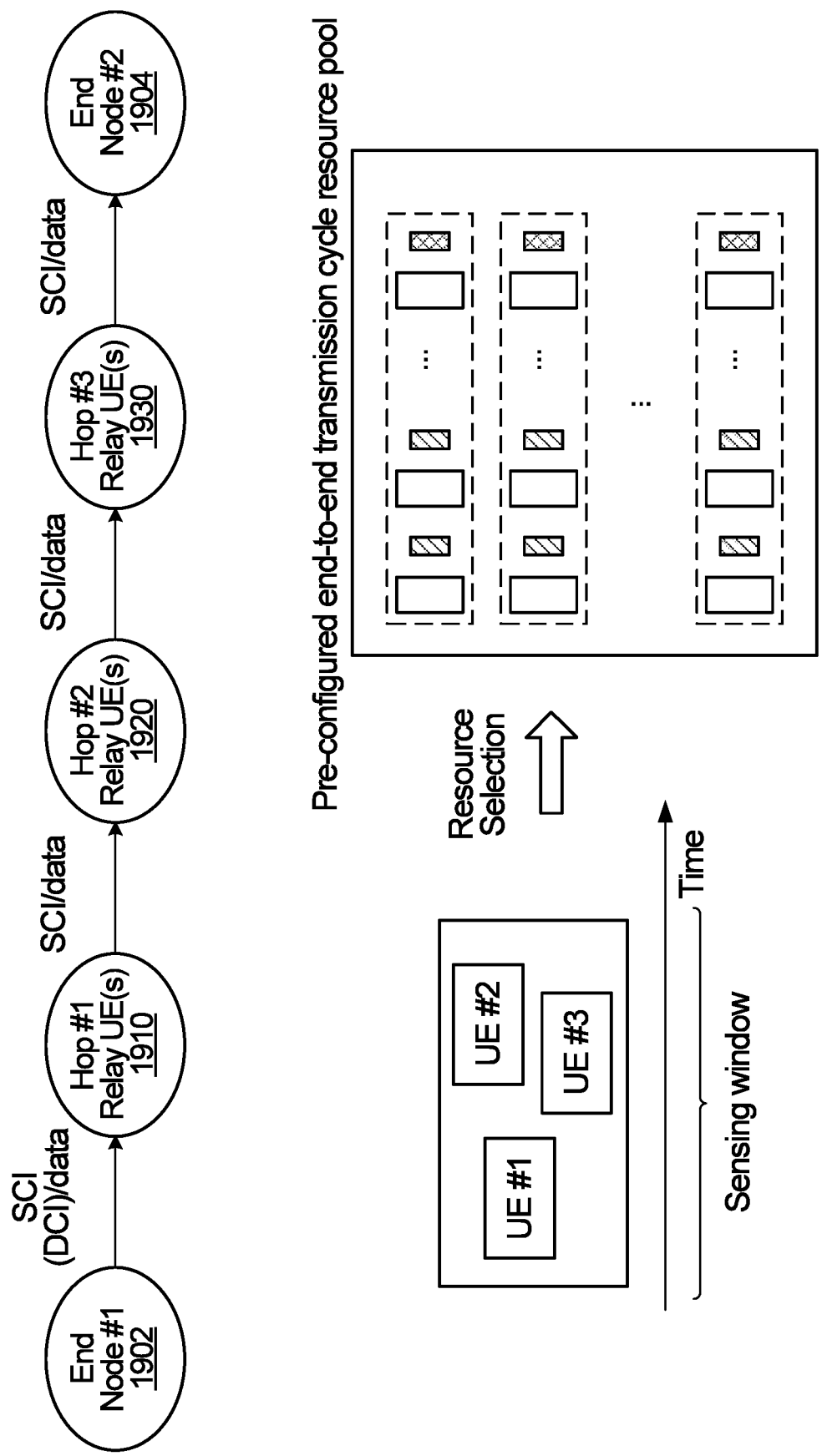
FIG. 19 illustrates an example of resource allocation by sensing and selection from a set of pre-configured resources in a resource pool.

A resource could potentially be selected after sensing from a set of pre-configured resources in a resource pool. This is shown by way of example in FIG. 19, again in the context of a three-hop path with one or more relay UEs 1910, 1920, 1930 at each hop between two end nodes 1902, 1904. A resource group is defined by time duration and is part of end-to-end cycle in some embodiments, while a resource pool here may refer multiple end-to-end cycles as indicated in FIG. 19. Resource pool may therefore be more general term than resource group.

As shown, a resource allocation could be determined after sensing from a pre-configured resource pool, by the source node for example. This could be used for multi-hop UE-to-network relay or multi-hop UE-to-UE relay.

In an out of coverage scenario, an end node may not have a connection to a network device such as a gNB. The resource(s) for multi-hop transmission could be determined after sensing from one or more pre-configured/obtained resource pools.

The end node that initiates a multi-hop transmission may start with sensing in a sensing window on any transmission. For example, the end node could decode SCI and determine the resources that are used or are going to be used by another transmission. The end node may then determine and select, from a pre-configured pool of multi-hop resources, one or more resources for its transmission to avoid collision with existing transmissions.

For identification, information such as a selected resource ID to indicate the configuration of the selected resource and/or resource pool could be carried by SCI in a multi-hop transmission for example.

Figure 20:
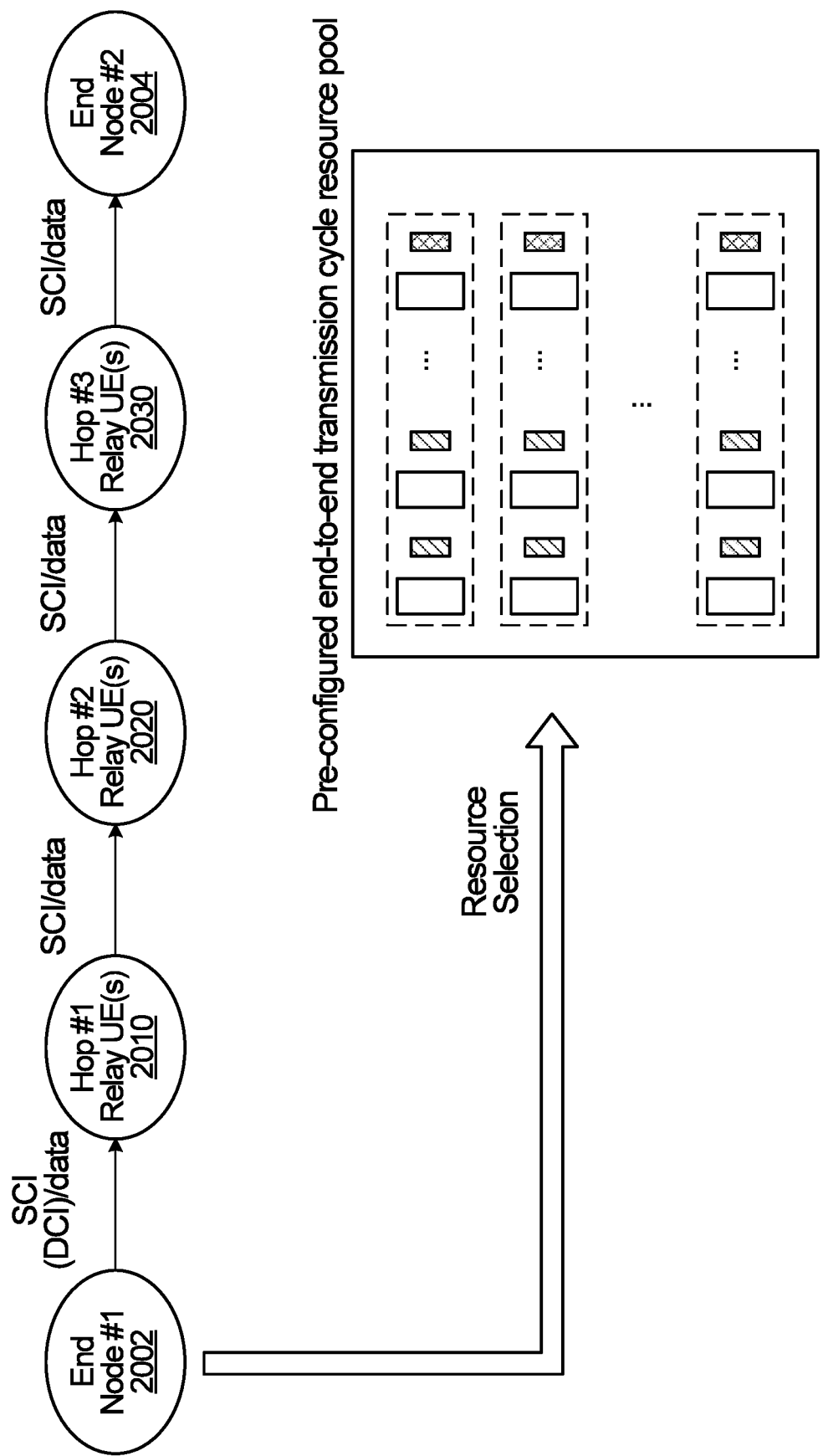
FIG. 20 illustrates an example of resource determination by a source end node from a pre-configured resource pool.

Resource determination by a source end node from a pre-configured resource pool is another option, and is shown by way of example in FIG. 20, in the context of a three-hop path between two end nodes 2002, 2004 through one or more relay UEs 2010, 2020, 2030 at each hop.

As shown in FIG. 20, a resource allocation could be determined from a pre-configured resource pool by the source node, which is end node #1 in the example shown. This could be used for multi-hop UE-to-Network relay or multi-hop UE-to-UE relay.

In an out of coverage scenario, the source node may not have a connection to a network device such as a gNB, and in this case one or more resources for multi-hop transmission could be determined by the source node from a pre-configured/obtained resource pool.

For identification, a selected resource ID or other information indicative of the selected resource(s) could be carried by SCI in multi-hop transmission, for example.

Figure 21:
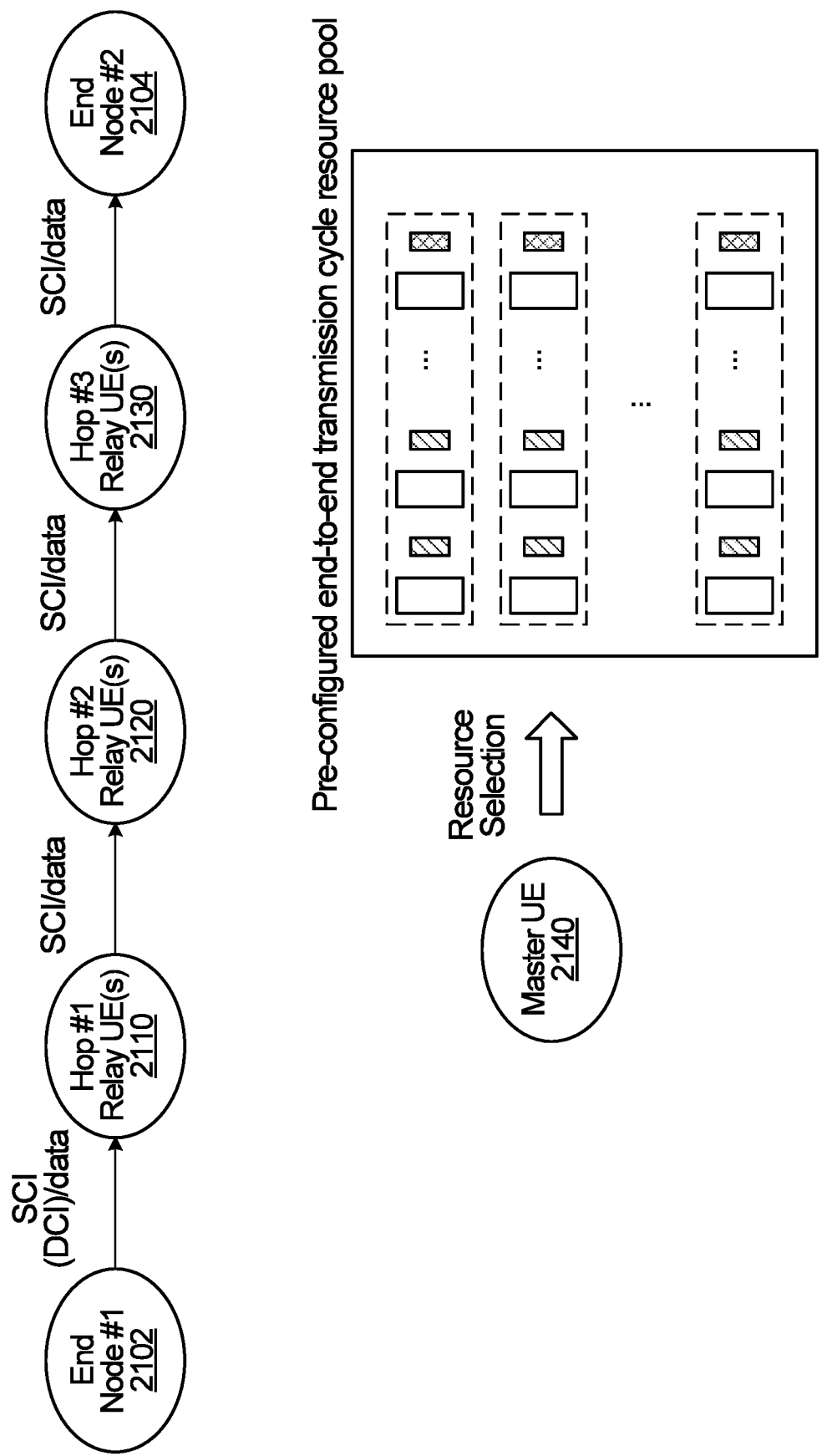
FIG. 21 illustrates an example of resource determination by a master UE from pre-configured resource pool.

One or more resources could be selected from a set of pre-configured resource pool by a master UE. An example is shown in FIG. 21, for a three-hop path between two end nodes 2102, 2104 through one or more relay UEs 2110, 2120, 2130 at each hop. A master UE is shown at 2140.

A resource allocation determined by a master UE could be used for multi-hop UE-to-network relay or multi-hop UE-to-UE relay.

If the master UE is out of coverage, then the master UE may not have a connection to a network device such as a gNB, and the resource(s) for multi-hop transmission could be determined by the master UE from a pre-configured/obtained resource pool.

As in other embodiments, for identification of the selected resource(s), one or more resource IDs or other information indicative of the selected resource(s) could be carried by SCI in multi-hop transmission, for example.

These and/or other resource allocation/scheduling approaches could be used together. For example:
- resource allocation by dynamic signaling could be used for traffic without a strong requirement on latency and reliability;
- resource allocation by higher-layer configuration could be used for steady traffic with a stronger latency requirement and no central scheduling capability, such as UE-to-network in uplink or UE-to-UE, but may not be spectrum efficient for sporadic traffic; and
- resource allocation by both higher-layer configuration and dynamic signaling could be used as an alternative for these two alternatives to bring benefits for both low latency and more spectrum efficiency.

In the event that different resource allocation approaches compete to use the same resources, one or more priority rules could be set to avoid collision. For example, in the above combination of three approaches, the second and third approaches could have higher priority than the first. In this case, traffic scheduled by the first approach may need to have an alternative resource allocated for transmission.

The examples above include several different options for signaling of resource allocation and scheduling for multi-hop UE relay. These options range from higher-layer signaling (semi-static signaling) to dynamic signaling, and combinations of these examples are also possible. Potential benefits include supporting various resource allocation and scheduling approaches for multi-hop UE relay for different types of traffic needs, and balancing overhead for transmission and performance requirements or targets such as latency and reliability.

For example, dynamic signaling embodiments may involve more signaling and cause more latency than other embodiments due to scheduling/signaling transmission. Embodiments that use higher-layer signaling may potentially waste resources (e.g., there is no data transmission at the pre-configured resource) and cause more latency as well (e.g., the data needs to be transmitted only at pre-configured resources). With pre-configured end-to-end cycle structure and dynamic signaling to trigger using it only when data arrives, resource waste from higher-layer signaling and dynamic signaling overhead as well as latency for both could be reduced. This illustrates how different signaling embodiments may differently trade off or balance overhead/latency, for example.

Figure 22:
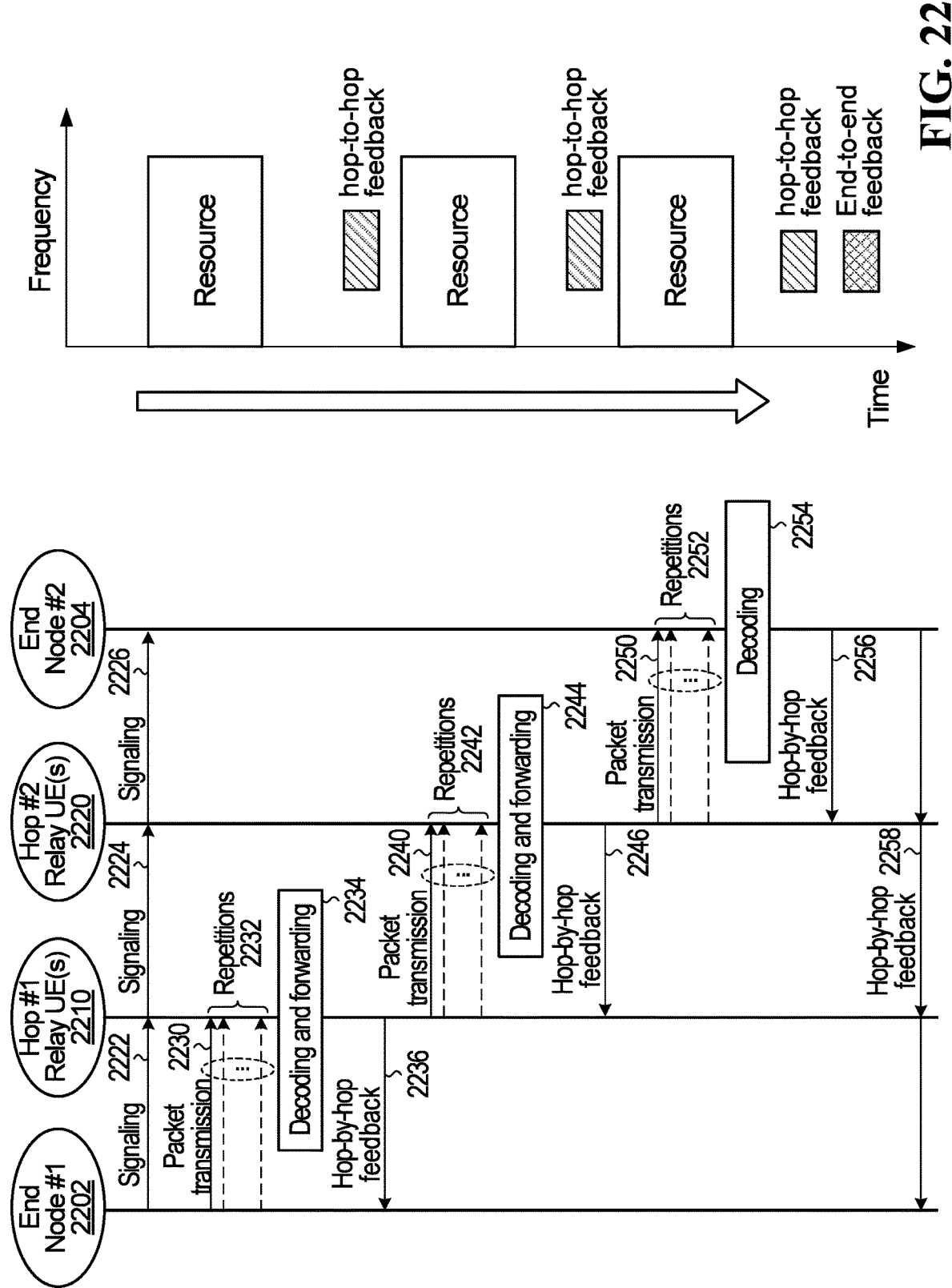
FIG. 22 includes a signal flow diagram and a time-frequency plot illustrating an example of multi-hop UE relay with UC according to an embodiment.

FIG. 22 includes a signal flow diagram and a time-frequency plot illustrating an example of multi-hop UE relay with UC according to an embodiment. The example shown in FIG. 22 is for a two-hop path between two end nodes 2202, 2204 through one or more relay UEs 2210, 2220 at each hop. Other embodiments may involve more hops, and/or other elements such as a master UE or a network device. A two-hop example is shown in FIG. 22 to avoid further congestion in the drawing. A corresponding resource allocation for each hop is also shown in FIG. 22.

In FIG. 22, the signaling at 2222, 2224, 2226 is intended to generally denote control signaling for allocating communication resources. Various examples of such signaling are provided herein, and any of those examples may be applied in multi-hop communications. Accordingly, signaling 2222, 2224, and 2226 may be any combination of DCI, SCI, higher-layer signaling, or any other suitable signaling as disclosed herein. In general, an end node or a relay UE may receive, transmit, or both receive and transmit such signaling.

Communication resources for multi-hop communications in some embodiments include communication resources, in a first time duration and a second time duration for example, for relaying data in respective hops of a multi-hop relay between first and second end nodes 2202, 2204, by user equipment shown in FIG. 22 as the relay UEs 2210, 2220.

Data is relayed in two hops in FIG. 22. Data in a packet transmission at 2230 is relayed by one or more relay UEs 2210 in a first hop. This is shown as a packet 2240. Data in that packet transmission is further relayed in a second hop at 2250, by one or more relay UEs 2220. This is illustrative of relaying data in a first hop and in a second hop between a first end node 2202 and a second end node 2204. Relaying data may involve relaying data in further hops, in addition to a first hop and a second hop as shown, between first and second end nodes. There may be other hops, for example, between the relay UEs 2210, 2220, between the end node 2202 and the relay UE(s) 2210, and/or between the end node 2204 and the relay UE(s) 2220.

The communication resources allocated in the signaling at 2222, 2224, 2226 may include communication resources for relaying data in each hop for an entire multi-hop communication path, from the end node 2202 to the end node 2204 in FIG. 22, for example. In an embodiment, communication resources in the first time duration are allocated for relaying the data by one or more relay UEs at the first hop of the multi-hop relay and the communication resources in the second time duration are allocated for relaying the data by the one or more relay UEs at the second hop of the multi-hop relay. References to one or more relay UEs in the context of relaying data are intended to encompass single-path relay through only one relay UE at any hop, and multi-path relay through one or more relay UEs at any hop.

FIG. 22 illustrates resources that are allocated not only for relaying the data in the two hops by relay UEs 2210, 2220 at 2240, 2250, but also for the packet transmission at 2230 from the end node 2202.

Communication resources are group-based in some embodiments. For example, the communication resources in the first time duration and the second time duration, for relaying data in the two hops shown in FIG. 22, may include communication resources from first and second communication resource groups. More generally, there may be multiple communication resource groups, with each of the communication resource groups including communication resources within a respective common time duration for the group. Examples of communication resource groups and allocating communication resource based on groups are provided elsewhere herein.

In an example above, communication resources include communication resources from first and second communication resource groups for relaying data in two hops. Communication resources may further include communication resources from third and fourth communication resource groups that include communication resources within a third time duration and a fourth time duration, respectively, for relaying data in the first hop and the second hop, respectively. For example, in an embodiment the communication resources in the first time duration are allocated for one of reception and transmission of the data in the first hop, by a relay UE at the first hop for example, and the communication resources in the third time duration are allocated for the other of reception and transmission in the first hop, by that relay UE at the first hop for example. Similarly, the communication resources in the second time duration may be allocated for one of reception and transmission of the data in the second hop, by a relay UE at the second hop for example, and the communication resources in the fourth time duration may be allocated for the other of reception and transmission in the second hop, by the relay UE at the second hop for example.

FIGS. 6 and 7, for example, illustrate communication resources allocated from different communication resource groups for reception and transmission, respectively, in each hop. With reference to FIG. 7, communication resources from Group #1 and Group #2 are allocated for reception and transmission by the Hop #1 Relay UE(s) 710 for relaying data in the left to right direction in the example shown, communication resources from Group #2 and Group #3 are allocated for reception and transmission by the Hop #2 Relay UE(s) 720 for relaying data in the left to right direction in the example shown, and communication resources from Group #3 and Group #4 are allocated for reception and transmission by the Hop #3 Relay UE(s) 730 for relaying data in the left to right direction in the example shown. These are illustrative examples only, and other allocations are possible.

FIGS. 6 and 7 also illustrate examples in which the communication resources allocated for transmission in one hop, such as the first hop in FIG. 22, are also allocated for reception in a next adjacent hop, such as the second hop in FIG. 22. With reference to FIG. 7, communication resources from Group #2 are allocated for transmission by the Hop #1 Relay UE(s) 710 and reception by the Hop #2 Relay UE(s) 720 for relaying data in the left to right direction in the example shown, and communication resources from Group #3 are allocated for transmission by the Hop #2 Relay UE(s) and reception by the Hop #3 Relay UE(s) 730 for relaying data in the left to right direction in the example shown. Again, these are illustrative examples only, and other allocations are possible.

As discussed elsewhere herein, each communication resource group may be separated from adjacent communication resource groups by a time gap. Such a time gap may be useful, for example, to accommodate processing of received data. The decoding and forwarding at 2234, 2244 by the relay UEs 2210, 2220 are examples of processing that may be performed during a time gap.

More generally, with reference to the first to fourth communication resource groups for reception and transmission in each hop according to an example above, the first communication resource group and the third communication resource group may be separated from each other by a first time gap for decoding of received data at 2234 before transmission of the received data in the first hop at 2240, and the second communication resource group and the fourth communication resource group may be separated from each other by a time gap for decoding of received data at 2244 before transmission of the received data in the second hop at 2250.

As another example, again with reference to FIG. 7, communication resources from Group #2 and Group #3 may be separated from each other by a time gap for decoding of received data by the Hop #2 Relay UE(s) 720 before transmission of the received data by the Hop #2 Relay UE(s) 720. This is another example, and other embodiments are possible.

Multi-hop relay may involve initial transmissions as shown at 2230, 2240, 2250, and one or more re-transmissions or repetitions as shown at 2232, 2242, 2252. For example, either or both of the communication resources in the first time duration and the second time duration may include communication resources for an initial transmission of data in the first hop at 2240 and/or the second hop at 2250, and communication resources for one or more re-transmissions of the data in the first hop at 2242 and/or the second hop at 2252 in a hybrid automatic repeat request (HARQ) process. Resources for one or more source node re-transmissions at 2232 may also be allocated.

Communication resources include communication resources for HARQ feedback in some embodiments, as shown by way of example in FIG. 22.

A HARQ process may include a hop-to-hop cycle HARQ process, an end-to-end HARQ process, or a combined HARQ process in which an end-to-end transmission cycle for one end-to-end transmission between first and second end nodes such as the end nodes 2202, 2204 includes multiple hop-to-hop transmission cycles. In some embodiments, a HARQ process supports early termination after successful decoding of data, and enables re-use of the communication resources allocated to re-transmissions after the early termination. These types of HARQ processes are discussed by way of example elsewhere herein.

FIG. 22 is an illustrative example. Other embodiments are possible.

For example, there are various options for the signaling at 2222, 2224, 2226. The signaling may be or include dynamic signaling at the physical layer. Additionally or alternatively, communication resources may be allocated in a higher-layer configuration. In some embodiments, communication resources are allocated in a higher-layer configuration, and signaling includes dynamic signaling, such as is downlink control information or sidelink control information.

In the context of group-based allocation, signaling may include higher layer signaling to indicate the communication resources from the first and second communication resource groups and relative timing relation between the first and second communication resource groups, and dynamic signaling to indicate a start of the communication resources, for example. The higher layer signaling may indicate an end-to-end pattern or transmission cycle resource pool, and the dynamic signaling may active transmission or indicate when the pattern is to start, for example.

Communication resources may be allocated based on sensing and selection of the communication resources from a pre-configured resource pool. In some embodiments, communication resources are allocated from a pre-configured resource pool by one of the first and second end nodes that is a source node of the data, which is end node 2202 in FIG. 22. Communication resources may be allocated from a pre-configured resource pool by a master UE.

All of these signaling and resource allocation embodiments are described by way of example at least above.

Other variations in FIG. 22 are also contemplated. Embodiments are not in any way limited to two-hop relay with one transmission per hop. Relaying data may involve one or both of: multiple transmissions of the data in the first hop, by the one or more relay UEs at the first hop for example, and multiple receptions of the data in the second hop, by the one or more relay UEs at the second hop for example. In general, one ore more relay UEs 2210 may transmit data to one or more relay UEs 2220 at least in embodiments that involve UC. Multiple transmissions/receptions are not limited to transmissions or receptions between relay UEs. There may also or instead be multiple transmissions or receptions between and end node and multiple relay UEs.

Multiple transmission and/or multiple receptions may involve broadcast communications, multicast communications, or unicast communications, for example.

FIG. 22 illustrates unidirectional relaying of data from the end node 2202 to the end node 2204. In this example, the communication resources in the first time duration and the second time duration are for relaying the data in a first direction in the respective hops of the multi-hop relay between the first and second end nodes 2202, 2204. It should be appreciated, however, that the signaling at 2222, 2224, 2226 and communication resources may also include communication resources in a third time duration and a fourth time duration for relaying further data in a second direction in the respective hops of the multi-hop relay between the first and second end nodes, from the end node 2204 to the end node 2202, as shown by way of example in FIG. 7. The communication resources in the third time duration may be allocated for relaying the further data in the first hop of the multi-hop relay and the communication resources in the fourth time duration may be allocated for relaying the further data in the second hop of the multi-hop relay, for example.

With continued reference to FIG. 7, in the example shown the resource allocations for relaying data in the left to right direction include communication resources from Group #1 and Group #2 for the Hop #1 Relay UE(s) 710, communication resources from Group #2 and Group #3 for the Hop #2 Relay UE(s) 720, and communication resources from Group #3 and Group #4 for the Hop #3 Relay UE(s) 730. For relaying further data in the for relaying data in the left to right direction in the opposite direction, from right to left in example shown, the resource allocations include communication resources from Group #1 and Group #2 for the Hop #3 Relay UE(s) 730, communication resources from Group #2 and Group #3 for the Hop #2 Relay UE(s) 720, and communication resources from Group #3 and Group #4 for the Hop #1 Relay UE(s) 710. As is the case with other examples herein, these are illustrative examples only, and other allocations are possible.

Other features disclosed herein may also or instead be implemented in further embodiments.

Embodiments are described above primarily in the context of example methods. Other embodiments are also possible.

Figure 23A:
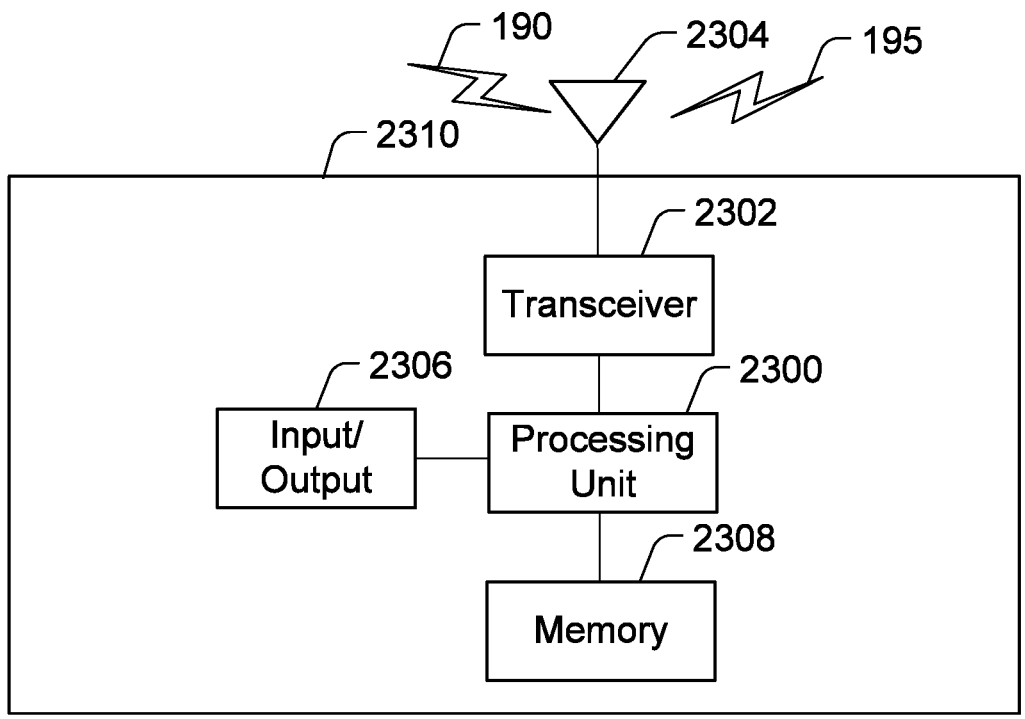
FIGS. 23A and 23B are block diagrams illustrating example devices that may implement the methods and teachings according to this disclosure.
Figure 23B:
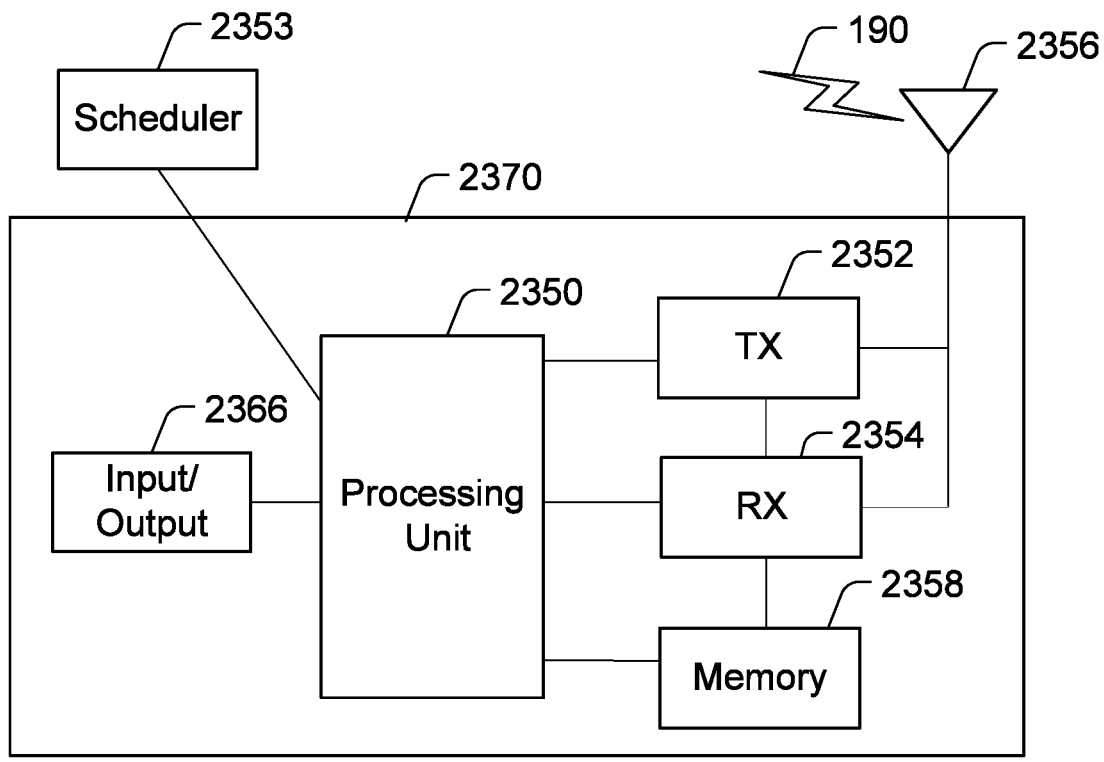

See, for example, FIGS. 23A and 23B which illustrate example devices that may implement the methods and teachings according to this disclosure.

FIG. 23A illustrates an example ED 2310, and FIG. 23B illustrates an example base station 2370. These components could be used in the system 100 (FIG. 1) or in any other suitable system.

As shown in FIG. 23A, the ED 2310 includes at least one processing unit 2300. The processing unit 2300 implements various processing operations of the ED 2310. For example, the processing unit 2300 could perform signal coding, data processing, power control, input processing, output processing, or any other functionality enabling the ED 2310 to operate in a communication system. The processing unit 2300 may also be configured to implement some or all of the functionality or embodiments described in more detail herein. Each processing unit 2300 includes any suitable processing or computing device configured to perform one or more operations. Each processing unit 2300 could, for example, include a microprocessor, microcontroller, digital signal processor, field programmable gate array, or application specific integrated circuit.

The ED 2310 also includes at least one transceiver 2302. The transceiver 2302 is configured to modulate data or other content for transmission by at least one antenna or NIC (Network Interface Controller) 2304. The transceiver 2302 is also configured to demodulate data or other content received by the at least one antenna 2304. Each transceiver 2302 includes any suitable structure for generating signals for wireless transmission and/or processing signals received wirelessly or by wire. Each antenna 2304 includes any suitable structure for transmitting and/or receiving wireless signals. One or multiple transceivers 2302 could be used in the ED 2310, and one or multiple antennas 2304 could be used in the ED 2310. Although shown as a single functional unit, a transceiver 2302 could be implemented using at least one transmitter and at least one separate receiver.

The ED 2310 further includes one or more input/output devices 2306 or interfaces. The input/output devices 2306 facilitate interaction with a user or other devices (network communications) in the network. Each input/output device 2306 includes any suitable structure for providing information to or receiving/providing information from a user, such as a speaker, microphone, keypad, keyboard, display, or touch screen, including network interface communications.

In addition, the ED 2310 includes at least one memory 2308. The memory 2308 stores instructions and data used, generated, or collected by the ED 2310. For example, the memory 2308 could store software instructions or modules configured to implement some or all of the functionality or embodiments described above and that are executed by the processing unit(s) 2300. Each memory 2308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 23B, the base station 2370 includes at least one processing unit 2350, at least one transmitter 2352, at least one receiver 2354, one or more antennas 2356, at least one memory 2358, and one or more input/output devices or interfaces 2366. A transceiver, not shown, may be used instead of the transmitter 2352 and receiver 2354. A scheduler 2353 may be coupled to the processing unit 2350. The scheduler 2353 may be included within or operated separately from the base station 2370. The processing unit 2350 implements various processing operations of the base station 2370, such as signal coding, data processing, power control, input processing, output processing, or any other functionality. The processing unit 2350 can also be configured to implement some or all of the functionality or embodiments described in more detail herein. Each processing unit 2350 includes any suitable processing or computing device configured to perform one or more operations. Each processing unit 2350 could, for example, include a microprocessor, microcontroller, digital signal processor, field programmable gate array, or application specific integrated circuit.

Each transmitter 2352 includes any suitable structure for generating signals for wireless transmission to one or more EDs or other devices. Each receiver 2354 includes any suitable structure for processing signals received wirelessly or by wire from one or more EDs or other devices. Although shown as separate components, at least one transmitter 2352 and at least one receiver 2354 could be combined into a transceiver. Each antenna 2356 includes any suitable structure for transmitting, receiving, or both transmitting and receiving wireless signals. While a common antenna 2356 is shown here as being coupled to both the transmitter 2352 and the receiver 2354, one or more antennas 2356 could be coupled to the transmitter(s) 2352, and one or more separate antennas 2356 could be coupled to the receiver(s) 2354.

Each memory 2358 includes any suitable volatile and/or non-volatile storage and retrieval device(s) such as those described above in connection to the ED 2310. The memory 2358 stores instructions and data used, generated, or collected by the base station 2370. For example, the memory 2358 could store software instructions or modules configured to implement some or all of the functionality or embodiments described herein and that are executed by the processing unit(s) 2350.

Each input/output device 2366 facilitates interaction with a user or other devices (network communications) in the network. Each input/output device 2366 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 2308 and the memory 2358, for example, could include one or more physical memory devices. Solid-state memory devices such as a Flash memory device could be implemented. Memory devices with movable or even removable storage media could also or instead be implemented.

FIG. 23A and FIG. 23B illustrate examples of a UE and a network device, respectively, in which embodiments could be implemented. More generally, an apparatus such as a UE or a network device may include a processor and a non-transitory computer readable storage medium, such as the processing unit 2300, 2350 and memory 2308, 2358 in FIG. 23A or FIG. 23B. Examples of UEs and network devices are provided elsewhere herein. Other components, such as a communication interface to which the processor is coupled, may also be provided. Elements 2302, 2304, 2352, 2354, 2356 in FIGS. 23A and 23B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the apparatus includes a communication interface, a processor coupled to the communication interface, and such a non-transitory computer readable storage medium coupled to the processor. A processor and a medium are shown by way of example as the processing unit 2300 and memory 2308 in FIG. 23A, and a communication interface may include such elements as the transceiver 2302 and/or one or more antennas 2304. Similarly, a processor and a medium are shown by way of example as the processing unit 2350 and memory 2358 in FIG. 23B, and a communication interface may include such elements as the transmitter 2352, the receiver 2354, and/or one or more antennas 2356.

According to an embodiment, the programming includes instructions to, or to cause a processor to communicate, in a wireless communication network, signaling for allocating communication resources in a first time duration and a second time duration for relaying data, in respective hops of a multi-hop relay between first and second end nodes, by user equipment at each hop. Relaying data in respective hops of the multi-hop relay involves relaying the data in a first hop of the multi-hop relay, by one or more relay UEs at the first hop for example, and in a second hop of the multi-hop relay, by one or more relay UEs at the second hop for example, between the first end node and the second end node. The communication resources in the first time duration are allocated for relaying the data in the first hop of the multi-hop relay, by the one or more relay UEs at the first hop for example, and the communication resources in the second time duration are allocated for relaying the data in the second hop of the multi-hop relay, by the one or more relay UEs at the second hop for example.

Some embodiments include any one or more of the following features, in any of various combinations:
  the communication resources in the first time duration and the second time duration include communication resources from first and second communication resource groups of a plurality of communication resource groups, each group of the plurality of communication resource groups comprising a plurality of communication resources within a respective common time duration for the group;
  the communication resources further comprise communication resources from third and fourth communication resource groups of the plurality of communication resource groups comprising communication resources within a third time duration and a fourth time duration, respectively, for relaying data in the first hop and the second hop, respectively;
  the communication resources in the first time duration are allocated for one of reception and transmission of the data in the first hop, by one relay UE of the one or more relay UEs at the first hop for example, and the communication resources in the third time duration are allocated for the other of reception and transmission in the first hop, by that relay UE at the first hop for example;
  the communication resources in the second time duration are allocated for one of reception and transmission of the data in the second hop, by one relay UE of the one or more relay UEs at the second hop for example, and the communication resources in the fourth time duration are allocated for the other of reception and transmission in the second hop, by that relay UE at the second hop for example;

the first communication resource group and the third communication resource group are separated from each other by a first time gap for decoding of received data before transmission of the received data in the first hop;

the second communication resource group and the fourth communication resource group are separated from each other by a time gap for decoding of received data before transmission of the received data in the second hop;

the first communication resource group and the second communication resource group are separated from each other by a time gap for decoding of received data in the second hop, by the one or more relay UEs at the second hop for example, before transmission of the received data in the second hop, by the one or more relay UEs at the second hop for example;

the communication resources allocated for transmission in the first hop, by the one or more relay UEs at the first hop for example, are also allocated for reception in the second hop, by the one or more relay UEs at the second hop for example;

the communication resources in the first time duration and the second time duration are for relaying the data in a first direction in the respective hops of the multi-hop relay between the first and second end nodes, and the communication resources further include communication resources in a third time duration and a fourth time duration for relaying further data in a second direction in the respective hops of the multi-hop relay between the first and second end nodes, with the communication resources in the third time duration being allocated for relaying the further data in the first hop of the multi-hop relay and the communication resources in the fourth time duration being allocated for relaying the further data in the second hop of the multi-hop relay;

each communication resource group of the plurality of communication resource groups is separated from adjacent communication resource groups by a time gap;

the relaying the data involves one or both of: multiple transmissions of the data in the first hop, by the one or more relay UEs at the first hop for example, and multiple receptions of the data in the second hop, by the one or more relay UEs at the second hop for example;

the multiple transmissions or the multiple receptions involve broadcast communications, multicast communications, or unicast communications;

the communication resources in the first time duration and the second time duration include communication resources for an initial transmission and one or more re-transmissions of the data in the first hop and the second hop in a HARQ process;

the communication resources further include communication resources for HARQ feedback;

the HARQ process includes a hop-to-hop cycle HARQ process, an end-to-end HARQ process, or a combined HARQ process in which an end-to-end transmission cycle for one end-to-end transmission between the first and second end nodes includes multiple hop-to-hop transmission cycles;

the HARQ process supports early termination after successful decoding of the data and enables re-use of the communication resources allocated to re-transmissions after the early termination;

the signaling is or includes downlink control information or sidelink control information;

the communication resources are allocated in a higher-layer configuration;

the communication resources are allocated in a higher-layer configuration, and the signaling is or includes downlink control information or sidelink control information;

the communication resources are allocated based on sensing and selection of the communication resources from a pre-configured resource pool;

the communication resources are allocated from a pre-configured resource pool by one of the first and second end nodes that is a source node of the data;

the communication resources are allocated from a pre-configured resource pool by a master UE;

the relaying data further involves relaying the data in further hops, in addition to the first hop and the second hop, of the multi-hop relay between first and second end nodes;

the signaling is or includes: higher layer signaling to indicate the communication resources from the first and second communication resource groups and relative timing relation between the first and second communication resource groups; and dynamic signaling to indicate a start of the communication resources.

Other features that could be implemented in apparatus embodiments could be or become apparent, for example, from the method embodiments disclosed herein.

Figure 24:
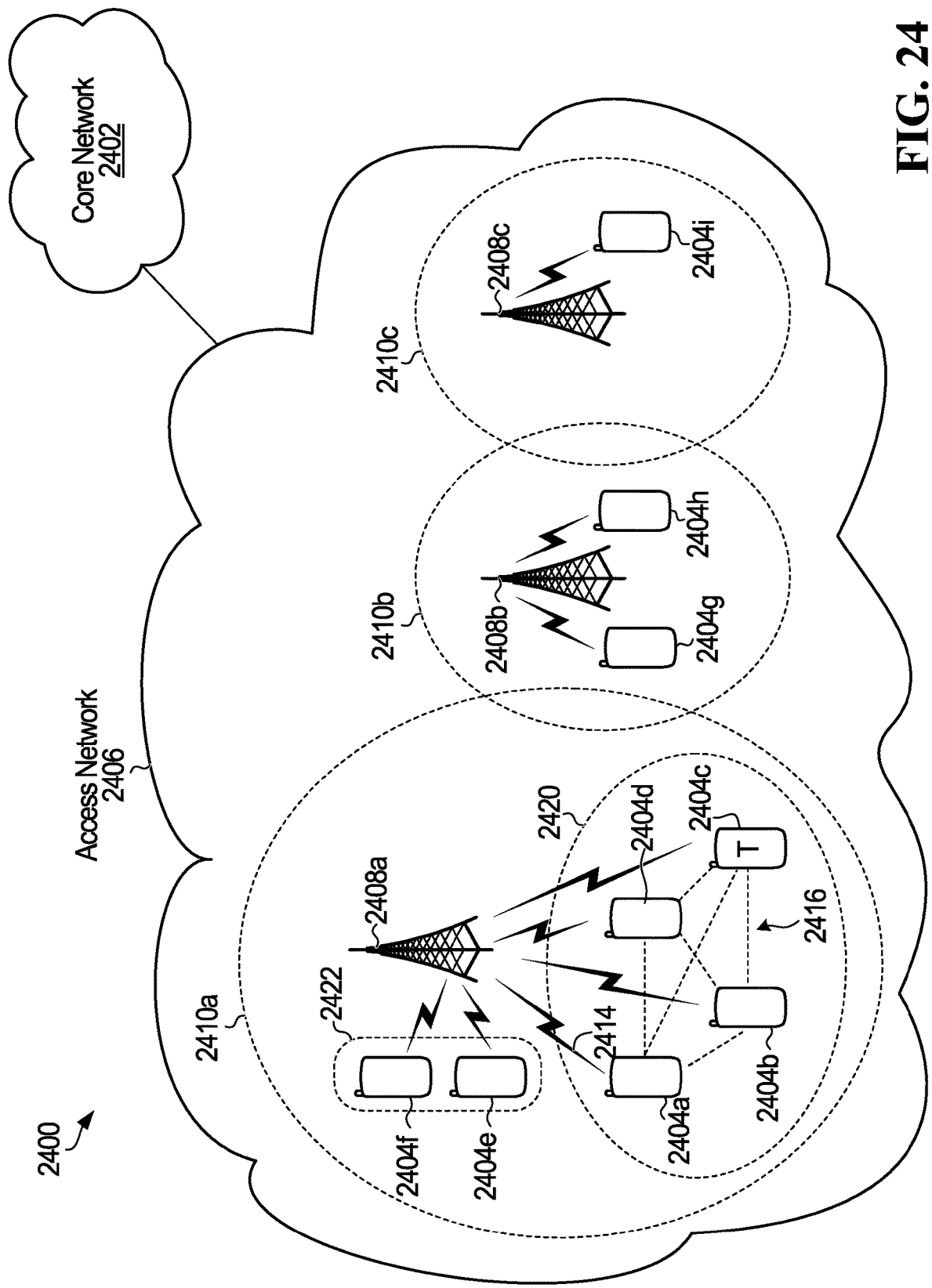
FIG. 24 is a block diagram illustrating an example of a telecommunications network according to one embodiment.

FIG. 24 is a block diagram illustrating an example of a telecommunications network 2400 according to one embodiment. The telecommunications network 2400 includes a core network 2402 and an access network 2406. The access network 2406 serves a plurality of UEs 2404*a*, 2404*b*, 2404*c*, 2404*d*, 2404*e*, 2404*f*, 2404*g*, 2404*h*, and 2404*i*. The access network 2406 is an Evolved Universal Terrestrial Access (E-UTRA) network in some embodiments. Another example of an access network 2406 is a cloud access network (C-RAN). The access network 2406 includes a plurality of BSs 2408*a*, 2408*b*, and 2408*c*. The BSs 2408*a-c* each provide a respective wireless coverage area 2410*a*, 2410*b*, and 2410*c*, also referred to as a cell. Each of the BSs 2408*a-c* could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 2408*a-c* are each connected to the core network 2402, either directly or through one or more central processing hubs, such as servers. The BSs 2408*a-c* could serve as a gateway between the wireline and wireless portion of the access network 2406.

Each one of BSs 2408*a-c* may instead be referred to as a base transceiver station, a radio BS, a network node, a transmit node, a transmit point, a Node B, an eNode B, a remote radio head (RRH), or otherwise, depending upon the implementation.

In operation, the plurality of UEs 2404*a-i* access the telecommunications network 2400 using the access network 2406 by wirelessly communicating with one or more of the BSs 2408*a-c*.

UEs 2404*a-d* are in close proximity to each other. Although the UEs 2404*a-d* can each wirelessly communicate with the BS 2408*a*, they can also directly communicate with each other, as represented at 2416. The communications represented at 2416 are direct communications between UEs, such as sidelink communications as disclosed herein, that do not go through an access network component, such as a BS. As shown in FIG. 24, UE to UE communications 2416 are directly between the UEs 2404a-d and are not routed through the BS 2408a, or any other part of the access network 2406. Communications 2416 may also be referred to as lateral communications. In embodiments disclosed herein, UE to UE communications use a sidelink channel and a sidelink air interface. On the other hand, a communication between an access network component, such as BS 2408a, and a UE, as in communication 2414, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 2416, the UEs 2404a-d may be able to assist with wireless communications between the UEs 2404a-d and the BS 2408a. As one example, if UE 2404c fails to correctly decode a packet received from the BS 2408a but UE 2404d is able to receive and correctly decode the packet from the BS 2408a, then UE 2404d could directly transmit the decoded packet to UE 2404c using sidelink communications 2416. As another example, if UE 2404c moves out of wireless coverage area 2418c, such that UE 2404c can no longer wirelessly communicate with the BS 2408a, then UE 2404b could forward messages between the UE 2404c and the BS 2408a. As another example, UE 2404a and UE 2404c could both receive a signal transmitted from the BS 2408a that carries a packet meant for UE 2404c. UE 2404a may then transmit to UE 2404c, via sidelink communications 2416, the signal as received by UE 2404a. UE 2404c may then use the information received from UE 2404a to help decode the packet from the BS 2408a. In these examples, capacity or coverage may be improved by forming an enhanced UE to assist one or more of the UEs 2404a, 2404b, and 2404d.

The UEs 2404a-d form a UE group 2420 in some embodiments. It should be noted, however, that features as disclosed herein are not dependent upon UE groups being explicitly formed in advance.

In UE group 2420 and a scenario in which the UE 2404c is to be assisted, the other UEs 2404a, 2404b, and 2404d form a cooperation candidate set for assisting the UE 2404c. If UEs 2404a and 2404b assist the UE 2404c, then the UEs 2404a and 2404b form the cooperation active set. As UEs 2404a-d move around, some may leave the UE group 2420. UE movement may also or instead result in other UEs joining the UE group 2420. Therefore, the cooperation candidate set may change over time. For example, the cooperation candidate set may change semi-statically. The UE group 2420 may also be terminated by the network 2406, for example, if the network determines that there is no longer a need or opportunity for the UE group 2420 to provide assistance in wireless communication between the BS 2408a and members of the UE group 2420.

There may be more than one UE group. For example, UEs 2404e and 2404f in FIG. 24 form another UE group 2422.

Figure 25:
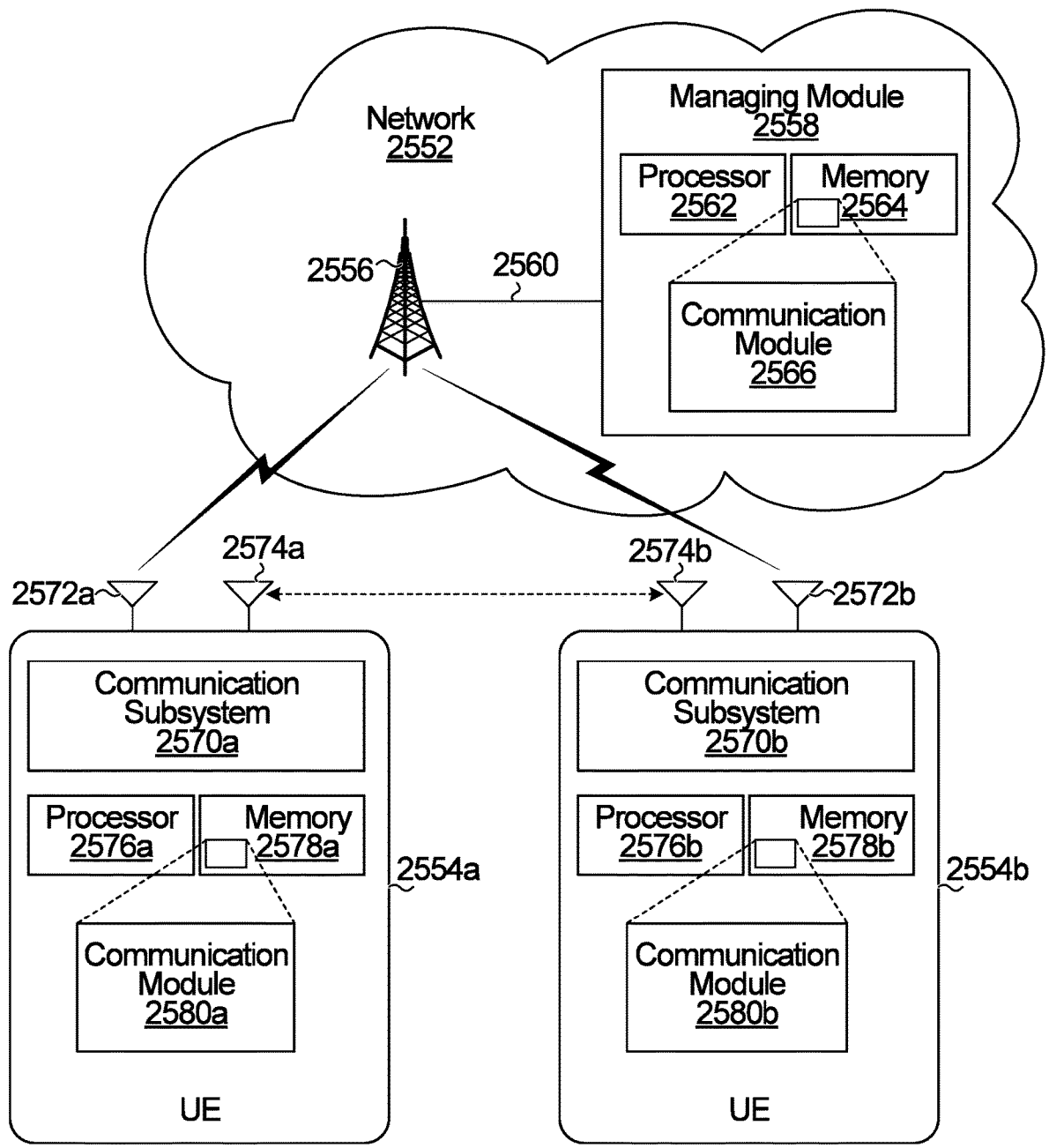
FIG. 25 is a block diagram illustrating an example of a network serving two UEs.

FIG. 25 is a block diagram illustrating an example of a network 2552 serving two UEs 2554a and 2554b, according to one embodiment. The network 2552 may be the access network 2406 from FIG. 24, and the two UEs 2554a and 2554b may be two of the four UEs 2404a-d in FIG. 24, or the UEs 2554a and 2554b may be UEs 2404e and 2404f in FIG. 24. However, more generally this need not be the case, which is why different reference numerals are used in FIG. 25.

The network 2552 includes a BS 2556 and a managing module 2558. The managing module 2558 instructs the BS 2556 to perform actions. The managing module 2558 is illustrated as physically separate from the BS 2556 and coupled to the BS 2556 via a communication link 2560. For example, the managing module 2558 may be part of a server in the network 2552. Alternatively, the managing module 2558 may be part of the BS 2556.

The managing module 2558 includes a processor 2562, a memory 2564, and a communication module 2566. The communication module 2566 is implemented by the processor 2562 when the processor 2562 accesses and executes a series of instructions stored in the memory 2564, the instructions defining the actions of the communication module 2566. When the instructions are executed, the communication module 2566 causes the BS 2556 to perform the actions described herein so that the network 2552 can establish, coordinate, instruct, or control UE cooperation and enhanced UE formation and operation. Alternatively, the communication module 2566 may be implemented using dedicated circuitry, such as an application specific integrated circuit (ASIC) or a programmed field programmable gate array (FPGA).

The UE 2554a includes a communication subsystem 2570a, two antennas 2572a and 2574a, a processor 2576a, and a memory 2578a. The UE 2554a also includes a communication module 2580a. The communication module 2580a is implemented by the processor 2576a when the processor 2576a accesses and executes a series of instructions stored in the memory 2578a, the instructions defining the actions of the communication module 2580a. When the instructions are executed, the communication module 2580a causes the UE 2554a to perform actions described herein in relation to UE cooperation. Alternatively, the module 2580a may be implemented by dedicated circuitry, such as an ASIC or an FPGA.

The communication subsystem 2570a includes processing circuitry, transmit circuitry, and receive circuitry for sending messages from and receiving messages at the UE 2554a. Although one communication subsystem 2570a is illustrated, the communication subsystem 2570a may be multiple communication subsystems. Antenna 2572a transmits wireless communication signals to, and receives wireless communications signals from, the BS 2556. Antenna 2574a transmits sidelink communication signals to, and receives sidelink communication signals from, other UEs, including UE 2554b. In some implementations there may not be two separate antennas 2572a and 2574a. A single antenna may be used. Alternatively, there may be several antennas, but not separated into antennas dedicated only to sidelink communication and antennas dedicated only to communicating with the BS 2556.

SL communications could be over Wi-Fi, in which case the antenna 2574a may be a Wi-Fi antenna. Alternatively, the sidelink communications could be over Bluetooth™, in which case the antenna 2574a may be a Bluetooth™ antenna. Sidelink communications could also or instead be over licensed or unlicensed spectrum.

The UE 2554b includes the same components described above with respect to the UE 2554a. That is, UE 2554b includes communication subsystem 2570b, antennas 2572b and 2574b, processor 2576b, memory 2578b, and communication module 2580b.

FIGS. 24 and 25 illustrate systems in which embodiments could be implemented. In some embodiments, a UE includes a processor, such as 2576a, 2576b in FIG. 25, and a non-transitory computer readable storage medium, such as 2578a, 2578b in FIG. 25, storing programming for execution by the processor. A non-transitory computer readable storage medium could also or instead be provided separately, as a computer program product. Examples are provided elsewhere herein.

The present disclosure encompasses various embodiments related to a general solution for multiple hop relay with UC for UE-to-network relay and UE-to-UE relay. Communications may be bidirectional in some embodiments.

Potential benefits of one or more disclosed embodiments may include, for example, facilitating multi-hop UE relay with UC to meet targets such as lower latency higher reliability, for some types of applications such as ultra-reliable low latency communication (URLLC). Another potential benefit is more robust multi-hop UE relay with improved performance and enhanced coverage.

Embodiments disclosed herein encompass at least the examples outlined below.

According to an example 1, a method involves communicating, in a wireless communication network, signaling for allocating communication resources in a first time duration and a second time duration for relaying data, in respective hops of a multi-hop relay between first and second end nodes, by user equipment (UE). The relaying data in respective hops of the multi-hop relay involves relaying the data in a first hop of the multi-hop relay and in a second hop of the multi-hop relay between the first end node and the second end node. The communication resources in the first time duration are allocated for relaying the data in the first hop of the multi-hop relay and the communication resources in the second time duration are allocated for relaying the data in the second hop of the multi-hop relay.

An example 2 relates to the method of example 1, wherein the communication resources in the first time duration and the second time duration comprise communication resources from first and second communication resource groups of a plurality of communication resource groups. Each group of the plurality of communication resource groups comprises a plurality of communication resources within a respective common time duration for the group.

An example 3 relates to the method of example 2, wherein the communication resources further comprise communication resources from third and fourth communication resource groups of the plurality of communication resource groups comprising communication resources within a third time duration and a fourth time duration, respectively, for relaying data in the first hop and the second hop, respectively. The communication resources in the first time duration are allocated for one of reception and transmission of the data in the first hop and the communication resources in the third time duration are allocated for the other of reception and transmission in the first hop. The communication resources in the second time duration are allocated for one of reception and transmission of the data in the second hop and the communication resources in the fourth time duration are allocated for the other of reception and transmission in the second hop.

An example 4 relates to the method of example 3, wherein the communication resources allocated for transmission in the first hop are also allocated for reception in the second hop.

An example 5 relates to the method of example 1, wherein the communication resources in the first time duration and the second time duration are for relaying the data in a first direction in the respective hops of the multi-hop relay between the first and second end nodes, and wherein the communication resources further comprise communication resources in a third time duration and a fourth time duration for relaying further data in a second direction in the respective hops of the multi-hop relay between the first and second end nodes. The communication resources in the third time duration are allocated for relaying the further data in the first hop of the multi-hop relay and the communication resources in the fourth time duration are allocated for relaying the further data in the second hop of the multi-hop relay.

An example 6 relates to the method of example 2, wherein each communication resource group of the plurality of communication resource groups is separated from adjacent communication resource groups by a time gap.

An example 7 relates to the method of example 3, wherein the first communication resource group and the third communication resource group are separated from each other by a first time gap for decoding of received data before transmission of the received data in the first hop, and wherein the second communication resource group and the fourth communication resource group are separated from each other by a time gap for decoding of received data before transmission of the received data in the second hop.

An example 8 relates to the method of any one of examples 1 to 7, wherein the relaying the data comprises one or both of: multiple transmissions of the data in the first hop and multiple receptions of the data in the second hop.

An example 9 relates to the method of example 8, wherein the multiple transmissions or the multiple receptions comprise broadcast communications, multicast communications, or unicast communications.

An example 10 relates to the method of any one of examples 1 to 9, wherein the communication resources in the first time duration and the second time duration comprise communication resources for an initial transmission and one or more re-transmissions of the data in the first hop and the second hop in a HARQ process.

An example 11 relates to the method of example 10, wherein the communication resources further comprise communication resources for HARQ feedback.

An example 12 relates to the method of example 10 or example 11, wherein the HARQ process comprises a hop-to-hop cycle HARQ process, an end-to-end HARQ process, or a combined HARQ process in which an end-to-end transmission cycle for one end-to-end transmission between the first and second end nodes includes multiple hop-to-hop transmission cycles.

An example 13 relates to the method of any one of examples 10 to 12, wherein the HARQ process supports early termination after successful decoding of the data and enables re-use of the communication resources allocated to re-transmissions after the early termination.

An example 14 relates to the method of any one of examples 1 to 13, wherein the signaling is downlink control information or sidelink control information.

An example 15 relates to the method of any one of examples 1 to 13, wherein the communication resources are allocated in a higher-layer configuration.

An example 16 relates to the method of any one of examples 1 to 13, wherein the communication resources are allocated in a higher-layer configuration, and wherein the signaling is downlink control information or sidelink control information.

An example 17 relates to the method of any one of examples 1 to 13, wherein the communication resources are allocated based on sensing and selection of the communication resources from a pre-configured resource pool.

An example 18 relates to the method of any one of examples 1 to 13, wherein the communication resources are allocated from a pre-configured resource pool by one of the first and second end nodes that is a source node of the data.

An example 19 relates to the method of any one of examples 1 to 13, wherein the communication resources are allocated from a pre-configured resource pool by a master UE.

An example 20 relates to the method of any one of examples 1 to 19, wherein the relaying data further comprises relaying the data in further hops, in addition to the first hop and the second hop, of the multi-hop relay between first and second end nodes.

An example 21 relates to the method of example 2, wherein the signaling comprises: higher layer signaling to indicate the communication resources from the first and second communication resource groups and relative timing relation between the first and second communication resource groups; and dynamic signaling to indicate a start of the communication resources.

According to an example 22, an apparatus comprises: a communication interface; a processor, coupled to the communication interface; and a non-transitory computer readable storage medium, coupled to the processor, storing programming for execution by the processor. The programming comprises instructions to communicate, in a wireless communication network, signaling for allocating communication resources in a first time duration and a second time duration for relaying data, in respective hops of a multi-hop relay between first and second end nodes, by user equipment (UE). The relaying data in respective hops of the multi-hop relay comprises relaying the data in a first hop of the multi-hop relay and in a second hop of the multi-hop relay between the first end node and the second end node. The communication resources in the first time duration are allocated for relaying the data in the first hop of the multi-hop relay and the communication resources in the second time duration are allocated for relaying the data in the second hop of the multi-hop relay.

An example 23 relates to the apparatus of example 22, wherein the communication resources in the first time duration and the second time duration comprise communication resources from first and second communication resource groups of a plurality of communication resource groups. Each group of the plurality of communication resource groups comprises a plurality of communication resources within a respective common time duration for the group.

An example 24 relates to the apparatus of example 23, wherein the communication resources further comprise communication resources from third and fourth communication resource groups of the plurality of communication resource groups comprising communication resources within a third time duration and a fourth time duration, respectively, for relaying data in the first hop and the second hop, respectively. The communication resources in the first time duration are allocated for one of reception and transmission of the data in the first hop and the communication resources in the third time duration are allocated for the other of reception and transmission in the first hop. The communication resources in the second time duration are allocated for one of reception and transmission of the data in the second hop and the communication resources in the fourth time duration are allocated for the other of reception and transmission in the second hop.

An example 25 relates to the apparatus of example 24, wherein the communication resources allocated for transmission in the first hop are also allocated for reception in the second hop.

An example 26 relates to the apparatus of example 22, wherein the communication resources in the first time duration and the second time duration are for relaying the data in a first direction in the respective hops of the multi-hop relay between the first and second end nodes, and wherein the communication resources further comprise communication resources in a third time duration and a fourth time duration for relaying further data in a second direction in the respective hops of the multi-hop relay between the first and second end nodes. The communication resources in the third time duration are allocated for relaying the further data in the first hop of the multi-hop relay and the communication resources in the fourth time duration are allocated for relaying the further data in the second hop of the multi-hop relay.

An example 27 relates to the apparatus of example 23, wherein each communication resource group of the plurality of communication resource groups is separated from adjacent communication resource groups by a time gap.

An example 28 relates to the apparatus of example 24, wherein the first communication resource group and the third communication resource group are separated from each other by a first time gap for decoding of received data before transmission of the received data in the first hop, and wherein the second communication resource group and the fourth communication resource group are separated from each other by a time gap for decoding of received data before transmission of the received data in the second hop.

An example 29 relates to the apparatus of any one of examples 22 to 28, wherein the relaying data comprises one or both of: multiple transmissions of the data in the first hop and multiple receptions of the data in the second hop.

An example 30 relates to the apparatus of example 29, wherein the multiple transmissions or the multiple receptions comprise broadcast communications, multicast communications, or unicast communications.

An example 31 relates to the apparatus of any one of examples 22 to 30, wherein the communication resources in the first time duration and the second time duration comprise communication resources for an initial transmission and one or more re-transmissions of the data in the first hop and the second hop in a HARQ process.

An example 32 relates to the apparatus of example 31, wherein the communication resources further comprise communication resources for HARQ feedback.

An example 33 relates to the apparatus of example 31 or example 32, wherein the HARQ process comprises a hop-to-hop cycle HARQ process, an end-to-end HARQ process, or a combined HARQ process in which an end-to-end transmission cycle for one end-to-end transmission between the first and second end nodes includes multiple hop-to-hop transmission cycles.

An example 34 relates to the apparatus of any one of examples 31 to 33, wherein the HARQ process supports early termination after successful decoding of the data and enables re-use of the communication resources allocated to re-transmissions after the early termination.

An example 35 relates to the apparatus of any one of examples 22 to 34, wherein the signaling is downlink control information or sidelink control information.

An example 36 relates to the apparatus of any one of examples 22 to 34, wherein the communication resources are allocated in a higher-layer configuration.

An example 37 relates to the apparatus of any one of examples 22 top 34, wherein the communication resources are allocated in a higher-layer configuration, and wherein the signaling is downlink control information or sidelink control information.

An example 38 relates to the apparatus of any one of examples 22 to 34, wherein the communication resources are allocated based on sensing and selection of the communication resources from a pre-configured resource pool.

An example 39 relates to the apparatus of any one of examples 22 to 34, wherein the communication resources are allocated from a pre-configured resource pool by one of the first and second end nodes that is a source node of the data.

An example 40 relates to the apparatus of any one of examples 22 to 34, wherein the communication resources are allocated from a pre-configured resource pool by a master UE.

An example 41 relates to the apparatus of any one of examples 22 to 40, wherein the relaying data further comprises relaying the data in further hops, in addition to the first hop and the second hop, of the multi-hop relay between first and second end nodes.

An example 42 relates to the apparatus of example 23, wherein the signaling comprises: higher layer signaling to indicate the communication resources from the first and second communication resource groups and relative timing relation between the first and second communication resource groups; and dynamic signaling to indicate a start of the communication resources.

According to an example 43, a computer program product comprises a non-transitory computer readable storage medium storing programming. The programming comprises instructions to communicate, in a wireless communication network, signaling for allocating communication resources in a first time duration and a second time duration for relaying data, in respective hops of a multi-hop relay between first and second end nodes, by user equipment (UE). The relaying data in respective hops of the multi-hop relay comprising relaying the data in a first hop of the multi-hop relay and in a second hop of the multi-hop relay between the first end node and the second end node. The communication resources in the first time duration are allocated for relaying the data in the first hop of the multi-hop relay and the communication resources in the second time duration are allocated for relaying the data in the second hop of the multi-hop relay.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
communicating, in a wireless communication network, signaling for allocating respective communication resource groups of a plurality of communication resource groups for relaying data, in respective hops of a multi-hop relay between first and second end nodes,
the relaying the data in the respective hops of the multi-hop relay comprising relaying the data by multiple relay user equipments (UEs) at a first hop of the multi-hop relay and by multiple relay UEs at a second hop of the multi-hop relay between the first end node and the second end node,
the respective communication resource groups comprising a first communication resource group that is allocated for relaying the data by the relay UEs at the first hop of the multi-hop relay,
the respective communication resource groups further comprising a second communication resource group that is allocated for relaying the data by the relay UEs at the second hop of the multi-hop relay,
wherein
the first communication resource group comprises a first plurality of communication resources within a first common time duration for the first group,
the second communication resource group comprises a second plurality of communication resources within a second common time duration for the second group, and
the first communication resource group is also allocated for relaying the data by relay UEs only at one or more further hops of the multi-hop relay that are not adjacent to the first hop.

2. The method of claim 1, wherein the first communication resource group is also allocated for reception by the relay UEs at the second hop.

3. The method of claim 1, wherein each communication resource group of the plurality of communication resource groups is separated from adjacent communication resource groups by a time gap to provide time for the relay UEs at any of the respective hops of the multi-hop relay to decode and forward the data.

4. The method of claim 3, wherein different adjacent communication resource groups of the plurality of communication resource groups are separated from each other by different time gaps.

5. The method of claim 1, wherein the relaying the data comprises one or both of: multiple transmissions of the data by the relay UEs at the first hop and multiple receptions of the data by the relay UEs at the second hop.

6. The method of claim 1, wherein the first plurality of communication resources within the first common time duration and the second plurality of communication resources within the second common time duration comprise communication resources for an initial transmission and one or more re-transmissions of the data in the first hop and the second hop in a hybrid automatic repeat request (HARQ) process.

7. The method of claim 6, wherein the HARQ process comprises a combined HARQ process in which an end-to-end transmission cycle for one end-to-end transmission between the first and second end nodes includes multiple hop-to-hop transmission cycles.

8. The method of claim 1, wherein the signaling is sidelink control information.

9. The method of claim 1, wherein the first communication resource group and the second communication resource group are allocated in a higher-layer configuration.

10. The method of claim 1, wherein the signaling comprises: higher layer signaling to indicate the first plurality of communication resources from the first communication resource group, the second plurality of communication resources from the second communication resource group, and relative timing relation between the first and second communication resource groups; and dynamic signaling to indicate a start of the first plurality of communication resources from the first communication resource group and the second plurality of communication resources from the second communication resource group.

11. An apparatus comprising:
a communication interface;
a processor, coupled to the communication interface;
a non-transitory computer readable storage medium, coupled to the processor, storing programming for execution by the processor, the programming comprising instructions to communicate, in a wireless communication network, signaling for allocating respective communication resource groups of a plurality of communication resource groups for relaying data, in respective hops of a multi-hop relay between first and second end nodes,
the relaying the data in the respective hops of the multi-hop relay comprising relaying the data by relay user equipments (UEs) at a first hop of the multi-hop relay and by relay UEs at a second hop of the multi-hop relay between the first end node and the second end node,
the respective communication resource groups comprising a first communication resource group that is allocated for relaying the data by the relay UEs at the first hop of the multi-hop relay,
the respective communication resource groups further comprising a second communication resource group that is allocated for relaying the data by the relay UEs at the second hop of the multi-hop relay,
wherein
the first communication resource group comprises a first plurality of communication resources within a first common time duration for the first group,
the second communication resource group comprises a second plurality of communication resources within a second common time duration for the second group, and
the first communication resource group is also allocated for relaying the data by relay UEs only at one or more further hops of the multi-hop relay that are not adjacent to the first hop.

12. The apparatus of claim 11, wherein the first communication resource group is also allocated for reception by the relay UEs at the second hop.

13. The apparatus of claim 11, wherein each communication resource group of the plurality of communication resource groups is separated from adjacent communication resource groups by a time gap to provide time for the relay UEs at any of the respective hops of the multi-hop relay to decode and forward the data.

14. The apparatus of claim 11, wherein the relaying the data comprises one or both of: multiple transmissions of the data by the relay UEs at the first hop and multiple receptions of the data by the relay UEs at the second hop.

15. The apparatus of claim 11, wherein the first plurality of communication resources within the first common time duration and the second plurality of communication resources within the second common time duration comprise communication resources for an initial transmission and one or more re-transmissions of the data in the first hop and the second hop in a hybrid automatic repeat request (HARQ) process.

16. The apparatus of claim 15, wherein the HARQ process comprises a combined HARQ process in which an end-to-end transmission cycle for one end-to-end transmission between the first and second end nodes includes multiple hop-to-hop transmission cycles.

17. The apparatus of claim 11, wherein the signaling is sidelink control information.

18. The apparatus of claim 11, wherein the first communication resource group and the second communication resource group are allocated in a higher-layer configuration.

19. The apparatus of claim 11, wherein the signaling comprises: higher layer signaling to indicate the first plurality of communication resources from the first communication resource group, the second plurality of communication resources from the second communication resource group, and relative timing relation between the first and second communication resource groups; and dynamic signaling to indicate a start of the first plurality of communication resources from the first communication resource group and the second plurality of communication resources from the second communication resource group.

20. A computer program product comprising a non-transitory computer readable storage medium storing programming, the programming comprising instructions to communicate, in a wireless communication network, signaling for allocating respective communication resource groups of a plurality of communication resource groups for relaying data, in respective hops of a multi-hop relay between first and second end nodes,
- the relaying the data in the respective hops of the multi-hop relay comprising relaying the data by relay user equipments (UEs) at a first hop of the multi-hop relay and by relay UEs at a second hop of the multi-hop relay between the first end node and the second end node,
- the respective communication resource groups comprising a first communication resource group that is allocated for relaying the data by the relay UEs at the first hop of the multi-hop relay,
- the respective communication resource groups further comprising a second communication resource group that is allocated for relaying the data by the relay UEs at the second hop of the multi-hop relay, wherein
- the first communication resource group comprises a first plurality of communication resources within a first common time duration for the first group,
- the second communication resource group comprises a second plurality of communication resources within a second common time duration for the second group, and
- the first communication resource group is also allocated for relaying the data by relay UEs only at one or more further hops of the multi-hop relay that are not adjacent to the first hop.

* * * * *